(12) United States Patent
Kumazawa et al.

(10) Patent No.: US 6,875,510 B2
(45) Date of Patent: Apr. 5, 2005

(54) STRUCTURE FOR REFLECTING LIGHT

(75) Inventors: Kinya Kumazawa, Yokosuka (JP);
Hiroshi Tabata, Yokohama (JP);
Hidekazu Takahashi, Yokohama (JP);
Yasuaki Kai, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 284 days.

(21) Appl. No.: 10/211,241

(22) Filed: Aug. 5, 2002

(65) Prior Publication Data

US 2003/0031846 A1 Feb. 13, 2003

(30) Foreign Application Priority Data

Aug. 6, 2001 (JP) ........................................ 2001-237342
Jul. 24, 2002 (JP) ........................................ 2002-215402

(51) Int. Cl.$^7$ .............................................. B32B 5/16
(52) U.S. Cl. ........................ 428/402; 428/403; 428/404; 428/406; 428/407; 349/112; 349/113; 349/165
(58) Field of Search .............................. 428/402, 403, 428/404, 406, 407; 349/112, 113, 165

(56) References Cited

U.S. PATENT DOCUMENTS

| | | | | |
|---|---|---|---|---|
| 5,699,135 A | * | 12/1997 | Hisatake et al. | ............ 349/113 |
| 5,731,858 A | * | 3/1998 | Hisatake et al. | ............ 349/112 |
| 5,753,277 A | | 5/1998 | Kikutani et al. | |
| 6,061,110 A | * | 5/2000 | Hisatake et al. | ............ 349/113 |

FOREIGN PATENT DOCUMENTS

| | | |
|---|---|---|
| EP | 0 491 551 B1 | 7/1996 |
| EP | 0 729 794 B1 | 11/2001 |
| JP | 44-13208 | 6/1969 |
| JP | 44-18369 | 8/1969 |
| JP | 62-170510 A | 7/1987 |
| JP | 63-120642 A | 5/1988 |
| JP | 4-295804 A | 10/1992 |
| JP | 8-226011 A | 9/1996 |
| JP | 8-234007 A | 9/1996 |
| JP | 3036305 B2 | 2/2000 |

OTHER PUBLICATIONS

K. Matsumoto, et al., "Studies on the Photo–Controllable Coloring Fibers Part 1: Photo–Controllable Coloring of Laminated Polymer Films by Optical Interference", Journal of the Textile Machinery Society of Japan, vol. 42, No. 2, (1989), pp. 55–62.

K. Matsumoto et al., "Studies on the Photo–controllable Coloring Fibers Part 2: Hue Analysis of the Photo–Controllable Coloring Films", Journal of the Textile Machinery Society of Japan, vol. 42, No. 10, (1989), pp. 60–68.

"Diffraction and Scattering Actions", Light Wave Engineering, published by Kyoritsu Shuppan Co., Ltd., pp. 106–109.

"Textile Engineering (II): Manufacturing, Structure and Material Characteristics of Textile", The Textile Machinery Society of Japan, pp. 116 and 117.

"Textile Engineering (III): Manufacturing, Performance and Material Characteristics of Thread", The Textile Machinery Society of Japan, pp. 233–235.

\* cited by examiner

*Primary Examiner*—Leszek Kiliman
(74) *Attorney, Agent, or Firm*—Foley & Lardner LLP

(57) ABSTRACT

A structure (1) for reflecting light uses at least two materials having different refractive indices. The structure (1) for reflecting light includes a first material (2) having light transmittance, and a plurality of fine structures (3) made of a second material, placed within the first material (2), with regularity sufficient to express reflection functions of light based on diffraction and scattering actions.

23 Claims, 31 Drawing Sheets

ENLARGED

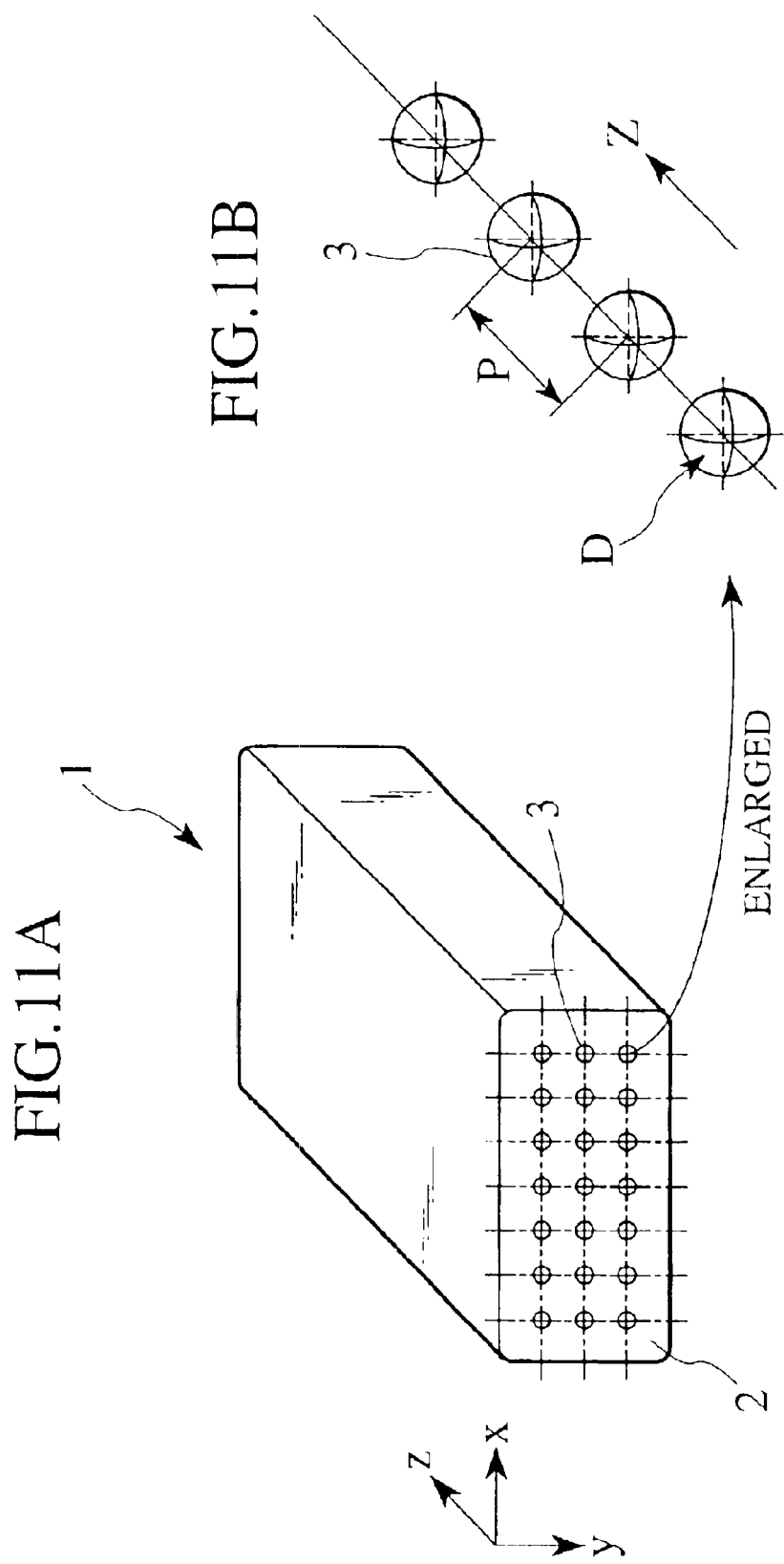

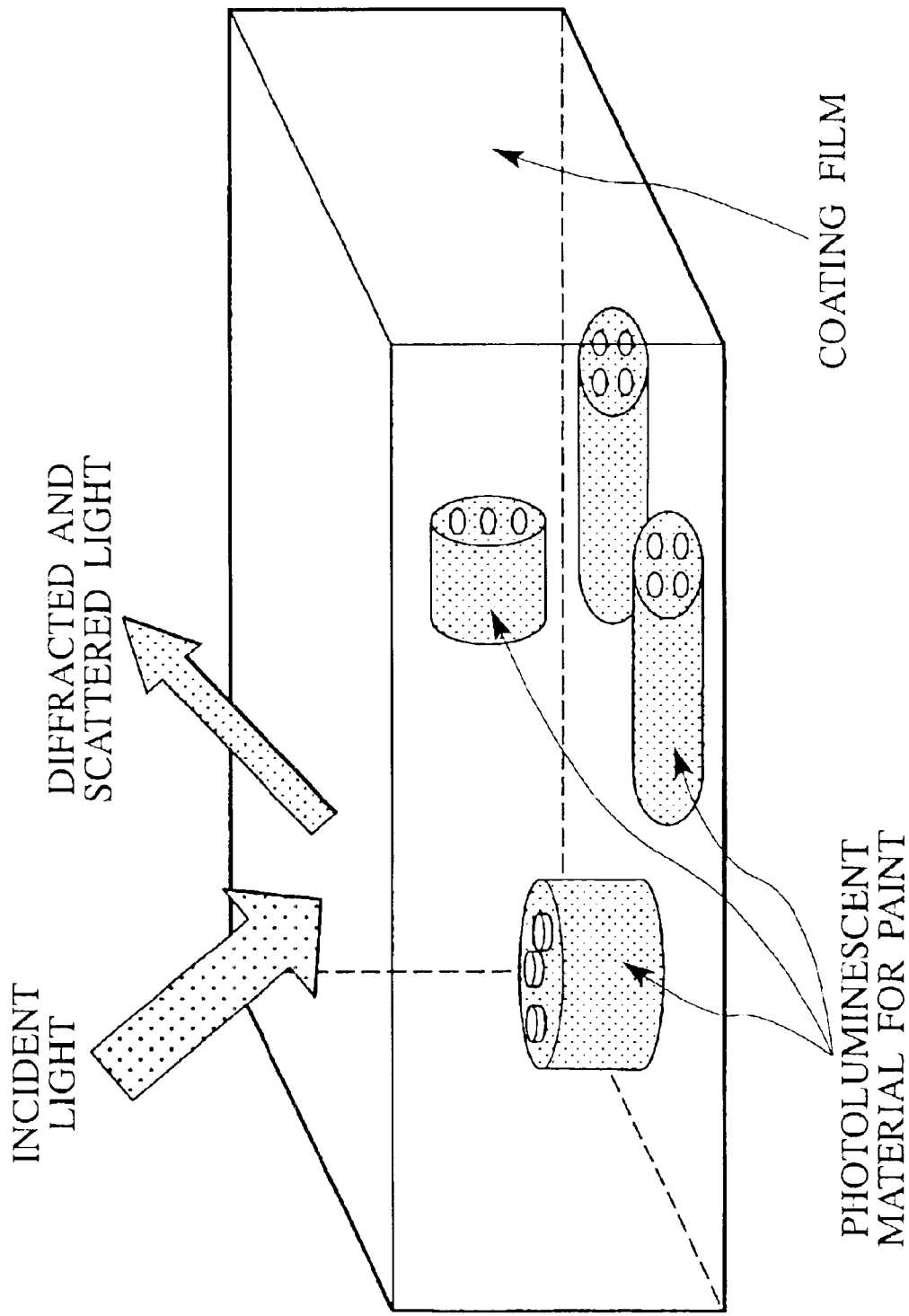

ENLARGED

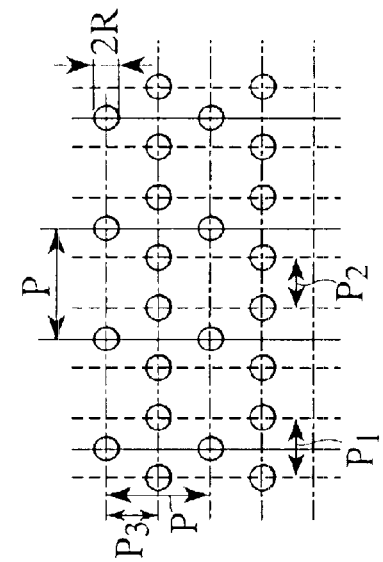
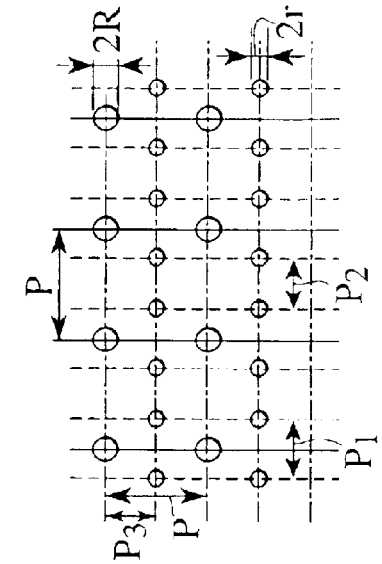
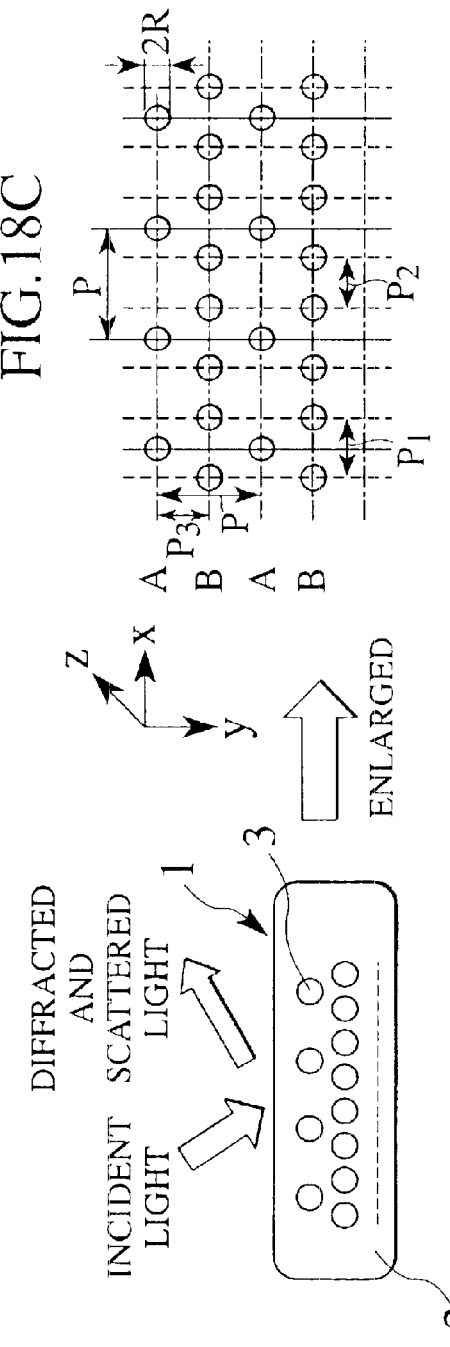
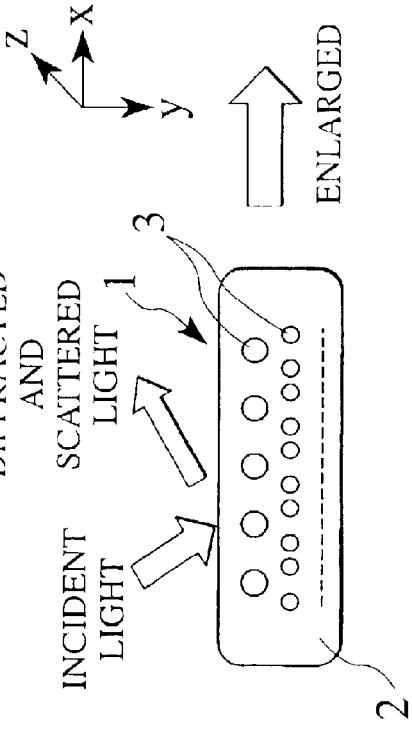
FIG.18A FIG.18B FIG.18C
FIG.19A FIG.19B FIG.19C

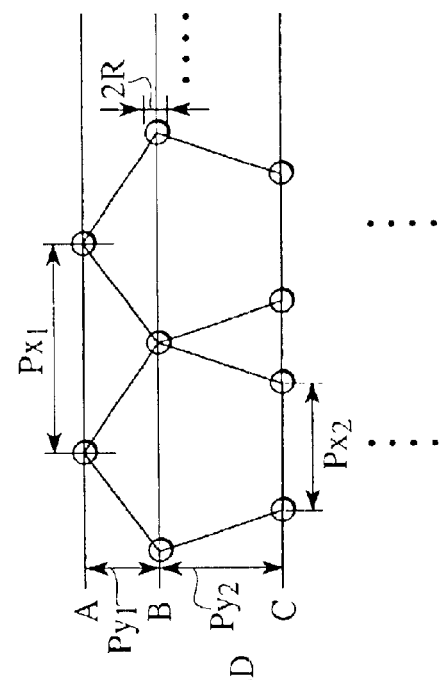
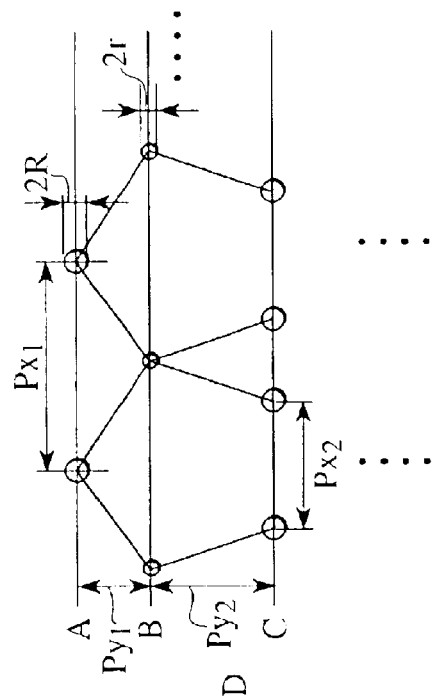
FIG.23A  FIG.23B  FIG.24A  FIG.24B

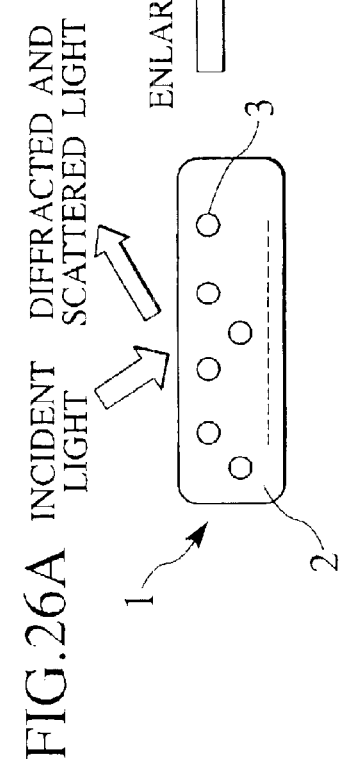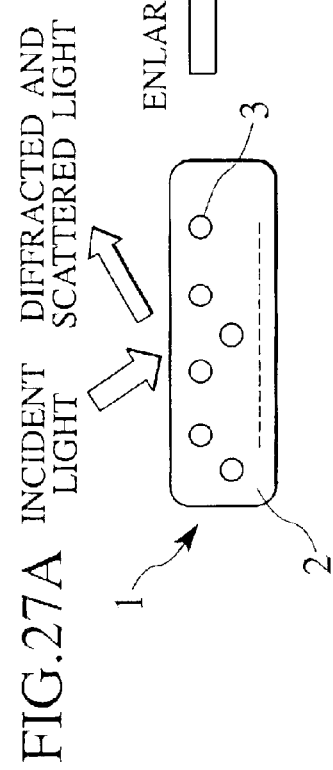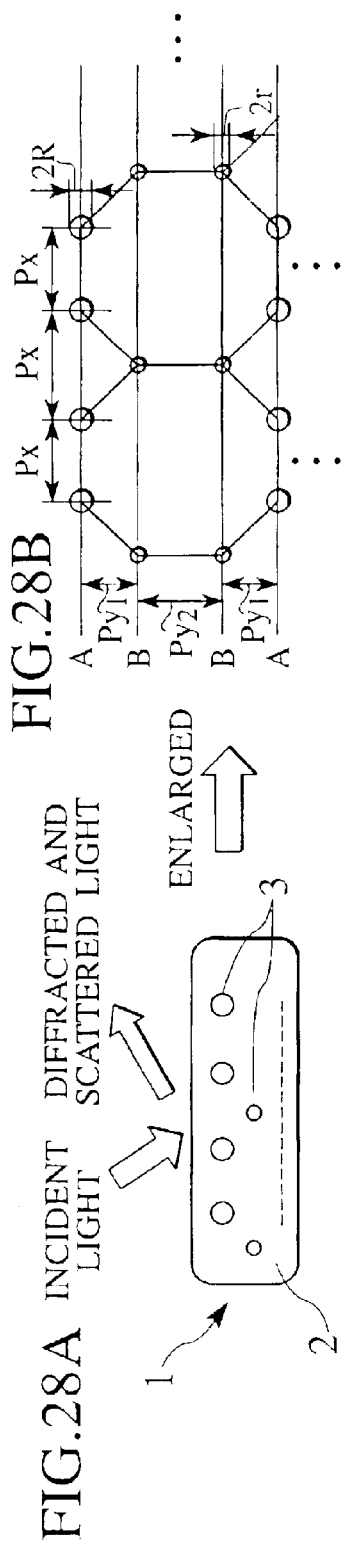

STRUCTURE FOR REFLECTING LIGHT

BACKGROUND OF THE INVENTION

1. Field of the Invention

The present invention relates to a structure for reflecting light, which reflects light within at least any one wave length range of a visible ray range, an infrared ray range and an ultraviolet ray range based on diffraction and scattering actions of light. Moreover, this invention relates to a structure for reflecting light and a product adopting the structure for reflecting light, which colors by reflecting a specific wave length of light, for example, in the visible ray range without requiring any pigment and dye.

2. Description of the Related Art

The type of light energy is roughly classified into: a visible ray that we can generally perceive with our eyes (wave length: 0.38 $\mu$m to 0.78 $\mu$m); an ultraviolet ray having a shorter wave length than the wave length in the visible ray range (wave length: 0.29 $\mu$m to 0.38 $\mu$m); and an infrared ray having a longer wave length than the wave length in the visible ray range (wave length: 0.78 $\mu$m or longer). The visible ray range is closely related to human visual perception; human eyes perceive the colors of various objects under the visible ray. Generally, the color of an object is generated by absorption of a part of light by the object. The coloring utilizing this principle involves a conventional method using a pigment or a dye, and almost all colorings that can be now found around us are based on this conventional coloring method.

However, such a conventional coloring method is disadvantageous not only in that various pigments or dyes themselves are required but also in that the step of mixing the pigments or dyes, a liquid waste treatment and the like are needed, so that these disadvantages are regarded problems in terms of the manufacturing process and the environment. Further, in view of quality, more than a few drawbacks have been pointed out in that pigments or dyes are eluted on the surface of an object to degrade the texture of the object or in that the designability or commercial value of an object is lost with the degradation of the initial quality of the object based on the faded color due to an ultraviolet ray or the like.

In order to solve the above problems, coloring means utilizing physical actions of light such as interference and diffraction without using so-called colorants such as a pigment and a dye (referred to as structural coloring in a broad sense) has been known. This coloring means achieves the coloring by the interaction between light and the surface of an object or a fine structure within the object. Several methods utilizing such coloring means have been already known in the art.

As a structure utilizing interference and reflection actions of light for achieving the coloring, a material having such a structure that an anisotropically molecular oriented film is sandwiched between two polarizing films to achieve the coloring has been presented (see Journal of THE TEXTILE MACHINERY SOCIETY OF JAPAN, Vol. 42, No. 2, p. 55 (1989) and Vol. 42 No. 10, p. 160 (1989)).

The principle of this coloring is as follows: First, when light from a normal direction is incident on a first polarizing film, the light passing through the first polarizing film is converted to light oscillating only in a fixed direction (linearly polarized light). Second, when the linearly polarized light passes through an anisotropically molecular oriented film which is oriented at 45 degrees, the plane of polarization of light is rotated so that light is converted into elliptically polarized light. Third, when the elliptically polarized light passes through a second polarizing film, the elliptically polarized light is reconverted into linearly polarized light. Then, since the light intensity varies depending on a wave length of light, the linearly polarized light serves as colored polarized light and thus is recognized as a color (i.e., coloring achieved by interference of polarized light).

Moreover, there has also been proposed a material having such a structure that two polymer materials with different refractive indices are alternately deposited to form several tens of layers so as to achieve the coloring (refer to Japanese Patent Application Laid-Open No. H4-295804 and Japanese Patent No. 3036305). The principle of this coloring is as follows: Fresnel reflections, which are caused at the interfaces between alternately deposited layers having different refractive indices, overlap each other to cause interference, resulting in an increase or a decrease in the wave length dependence of a reflectivity or the reflectivity itself. The coloring appears when Fresnel reflections overlap with each other at a specific wave length with a specific phase difference (coloring wave length $\lambda_1 = 2(n_a d_a + n_b d_b)$: coloring wave length $\lambda_1$ becomes maximum when optical thicknesses of the respective layers are equal to each other, i.e., $n_a d_a = n_b d_b$).

Japanese Patent Application Laid-Open No. H4-295804 discloses a film-like reflective polymer material including layers of a first polymer material and a second polymer material having refractive indices different from each other by at least 0.03, which are deposited to a thickness of about 0.1 $\mu$m. Further, the inventors of the present invention also disclose, in Japanese Patent No. 3036305, a fibrous coloring structure having a structure in which two polymer materials having different refractive indices are alternately laminated. The coloring fiber disclosed in Japanese Patent No. 3036305 is a non-dyed coloring fiber, changing its color tone depending on the viewing angle. Moreover, when combined with a thread of a particular color, the combined effects of the thread and the fiber permit the coloring fiber to exhibit the texture peculiar to interference.

Meanwhile, as a structure utilizing diffraction and interference actions, a structure having narrow grooves of a constant width on the surface of a fiber to present diffraction and interference colors has been known (refer to Japanese Patent Application Laid-Open No. S62-170512, Japanese Patent Application Laid-Open No. S63-120642, or Japanese Patent Application Laid-Open No. H8-234007). The principle of this coloring is described as follows: when light is incident on an object having a plane or a concave plane on which a large number of grooves in predetermined size (predetermined interval and depth) are regularly formed (as in a so-called diffraction grating), an optical path difference $\Delta L$ is generated. When the optical path difference $\Delta L$ is equal to an integer multiple of a wave length $\lambda$, reflected rays mutually enhance their intensities to increase the brightness (optical path difference $\Delta L = m\lambda$: where m is a diffraction order, and m=0, 1, 2 ... ). In practice, incident light at a certain incident angle is provided with the coloring having a wave length $\lambda$ at a predetermined diffraction angle.

SUMMARY OF THE INVENTION

Among the above-described structures, however, in the structure in which the anisotropically molecular oriented film is sandwiched between the polarizing films, it is difficult to stably fabricate a fine fiber or a minute chip (platelet) for flakes at a low cost. Furthermore, the obtained color is not sufficient in view of brightness. Moreover, also in the reflective polymer object including the first and second layers of polymers having different refractive indices, it is difficult to fabricate a fine fiber or a minute chip for flakes at a low cost. Further, there is an essential problem that the color of an object is perceived as gray at a wide viewing angle (having a dead angle), which is peculiar to an interference phenomenon. The meaning of the term "dead angle" herein is as follows: when light from a normal direction is incident on an irradiated surface of an interference coloring film or fiber and human eyes see the light at the position θ degrees away from the normal direction, a coloring wave length λ1 shifts to the side of a shorter wave length with an increase in the angle θ, as compared with that viewed from the normal direction, based on the multilayered thin film interference theory. Finally, the coloring wave length λ1 gets out of a visible ray range to shift into an ultraviolet ray range, so that the wave length cannot be perceived as a color. Thus, the "dead angle" herein means an angle at which a wave length cannot be perceived as a color as described above.

Contrary to the advantage of a fibrous coloring structure disclosed in Japanese Patent No. 3036305 that the coloring structure has color tones changing depending on a viewing angle, the coloring structure also has a problem that color is perceived as gray at a wide viewing angle, which is a peculiar problem to an interference phenomenon.

Meanwhile, a structure utilizing diffraction and interference actions has few problems as described above. However, such a structure has problems in that its color is perceived as iridescent like a compact disk to give a cheap image as an article, a special apparatus or a special fabrication method is needed for a structure in a film form, such a structure is of little practical use, and the like. A conventional coloring structure has such problems to be solved.

The present invention is achieved in view of the above-mentioned problems in a conventional coloring structure having structural coloring functions. It is an object of the present invention to provide a structure for reflecting light, which solves the problem that color is perceived as gray at a wide viewing angle (having a dead angle). It is another object of the present invention to provide a structure for reflecting light, which has novel coloring functions for expressing functions of providing the profoundness of a color, the profoundness being derived from the steepness of a spectrum of a coloring wave length to be obtained.

The first aspect of the present invention provides a structure for reflecting light, in any one of a fibrous form and a film form, having an optical function of at least one of reflection properties for a visible ray, an infrared ray and an ultraviolet ray, the structure comprising: a first material; and a second material having a different refractive index from that of the first material, wherein at least the first material has light transmittance in a cross section of the structure, and wherein a group of a plurality of fine structures formed of the second material is surrounded by the first material, and arranged within the first material with regularity sufficient to express reflection functions of light based on diffraction and scattering actions.

BRIEF DESCRIPTION OF THE DRAWINGS

FIG. 11A is a perspective view showing a structure including spherical fine structures in an orthogonal arrangement as an embodiment of the structure for reflecting light according to the present invention;

FIG. 11B is an enlarged explanatory view of the spherical fine structures in the structure for reflecting light shown in FIG. 11A;

FIG. 14 is a schematic diagram for specifically illustrating a direction and a site in which light reflection functions are expressed in the structure (thread) of the present invention, showing the situation where the structure (thread) is chipped (cut into platelets) to be integrated in a paint as flakes for painting;

FIGS. 18A to 18C are explanatory views in the case where a group of fine structures (cylindrical bodies) is arranged in a triangle form in an x-y plane and the fine structures (cylindrical bodies) have the same diameter;

FIGS. 19A to 19C are explanatory views in the case where the group of fine structures (cylindrical bodies) is arranged in a triangle form in an x-y plane and the fine structures (cylindrical bodies) have different diameters in a y direction;

FIGS. 23A and 23B are explanatory views in the case where the group of fine structures (cylindrical bodies) is arranged in a pentagonal form in an x-y plane, the fine structures (cylindrical bodies) have the same diameter, and a pitch in a z direction is identical;

FIGS. 24A and 24B are explanatory views in the case where the group of fine structures (cylindrical bodies) is arranged in a pentagonal form in an x-y plane, the fine structures (cylindrical bodies) have two different diameters, and a pitch in a z direction differs;

FIGS. 26A and 26B are explanatory views in the case where the group of fine structures (cylindrical bodies) is arranged in an octagonal form in an x-y plane, the fine structures (cylindrical bodies) have the same diameter, and two different pitches in an x direction are present;

FIGS. 27A and 27B are explanatory views in the case where the group of fine structures (cylindrical bodies) is arranged in an octagonal form in an x-y plane, the fine structures (cylindrical bodies) have the same diameter, and a pitch in an x direction is identical;

FIGS. 28A and 28B are explanatory views in the case where the group of fine structures (cylindrical bodies) is arranged in an octagonal form in an x-y plane, the fine structures (cylindrical bodies) have different diameters in a y direction, and a pitch in an x direction is identical;

DETAILED DESCRIPTION OF THE PREFERRED EMBODIMENTS

Hereinafter, in order to describe the present invention more in detail, preferred embodiments of this invention will be explained with reference to the accompanying drawings below.

Figure 1A:
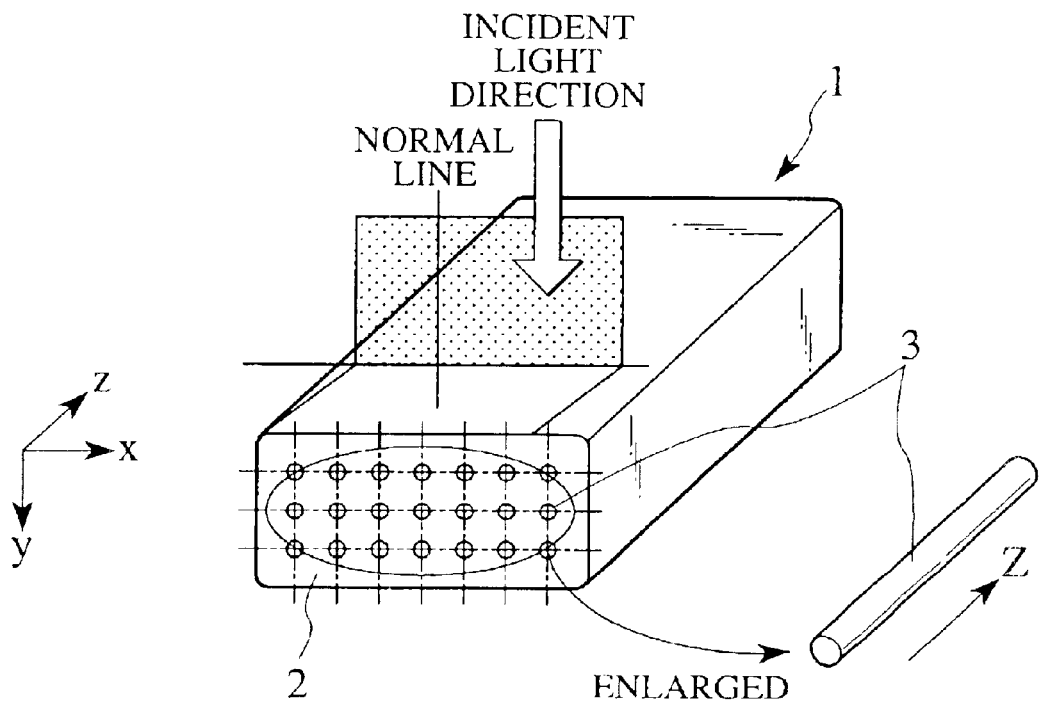
FIG. 1A is a perspective view showing a fundamental structure of a structure for reflecting light according to the present invention.

FIG. 1A is a conceptual diagram showing the case where a structure for reflecting light according to the present invention is applied to a fibrous or film-like structure. A structure 1 for reflecting light according to the present invention is made of at least first and second materials having different refractive indices. Here, a plurality of fine structures 3 (a group of fine structures) made of the second material, each having a circular cross section, are arranged within the first material 2 having light transmittance and a rectangular cross section, with regularity sufficient to express light reflection functions based on diffraction and scattering actions.

Figure 1B:
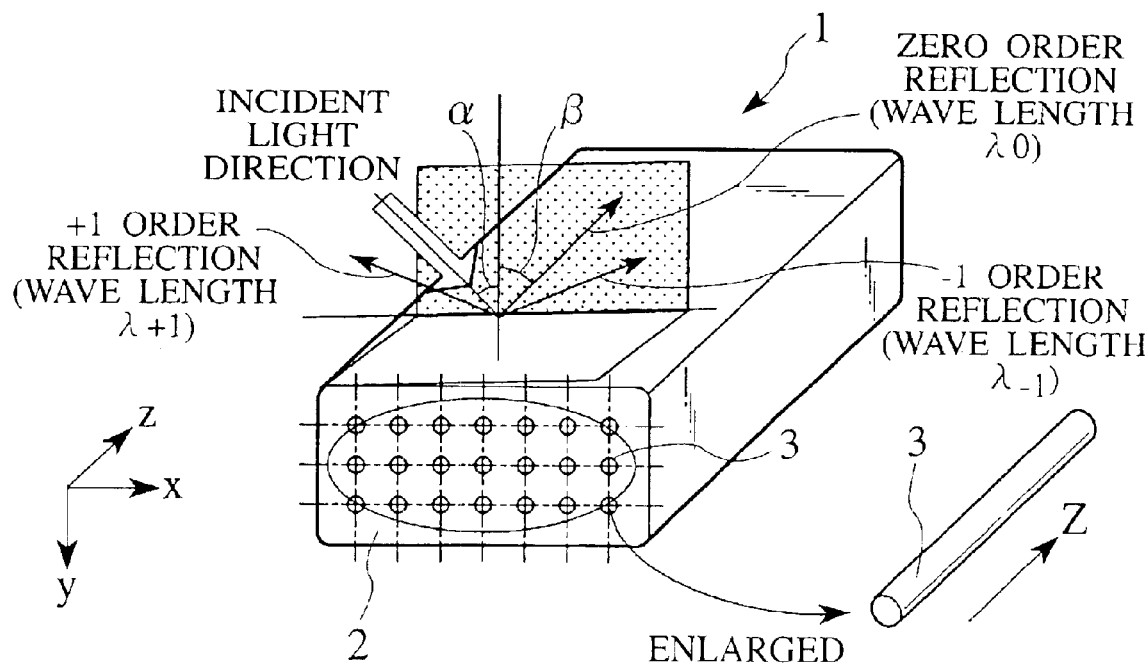
FIG. 1B is an explanatory view for the definition of an incident angle, a diffraction angle and the like in the structure for reflecting light according to the present invention.
Figure 2A:
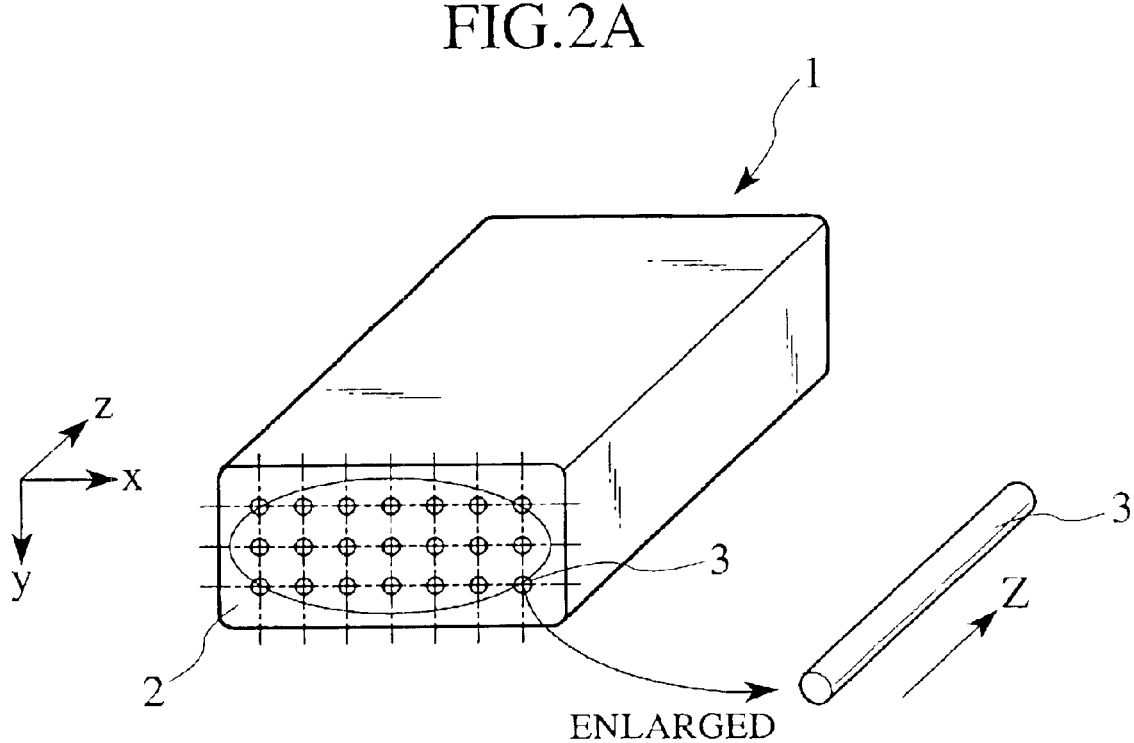
FIG. 2A is a perspective view showing a structure with an orthogonal arrangement as an embodiment of a structure for reflecting light according to the present invention.
Figure 2B:
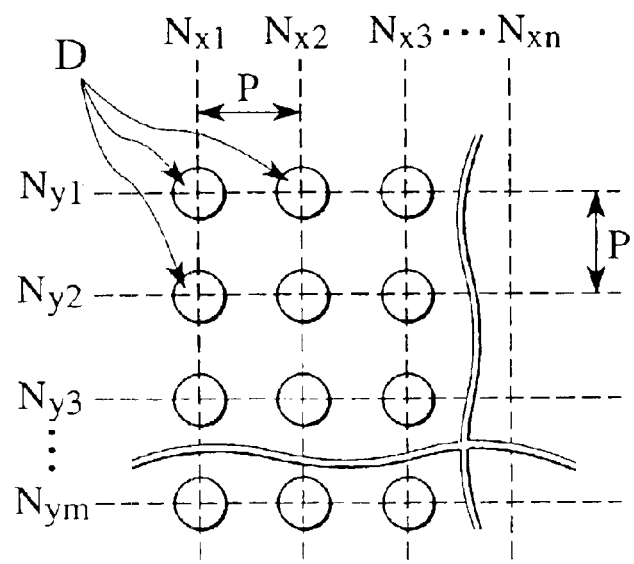
FIG. 2B is an enlarged explanatory view of an x-y plane in the structure for reflecting light shown in FIG. 2A.

Since it is preferred to define in advance the axes of coordinates with respect to an incident direction of light for understanding the present invention, the axes of coordinates are defined as follows: that is, in a cross section of the structure 1 for reflecting light, in the case where an equivalent line obtained by connecting the centers of the fine structures 2 constituting the fine structure group, which are situated in the outermost periphery of the structure 1, is placed so as to orthogonally cross an y direction, it is assumed that an incident angle of light is the y direction, a direction of the equivalent line is x, and a depth direction orthogonally crossing the x-y plane is z. Moreover, supposing a normal line with respect to the structure 1 as shown in FIG. 1B, it is assumed that reflected light of incident light at an incident angle α (diffraction angle β) is referred to as 0-order reflection and that reflected light of positive orders (+1, +2, . . . ) is emitted toward the incident light side whereas reflected light of negative orders (−1, −2, . . . ) is emitted toward the reflected light side, where peak wave lengths of reflected light of the respective orders are designated as, for example, $\lambda_0$ (0-order reflected light), $\lambda_1$ (minus first order reflected light) and the like. FIG. 2A is a schematic view showing the entire structure 1, in which a plurality of the fine structures 3 made of the second material are regularly arranged in a matrix (array) in the x direction and the y direction within the first material 2 so that the x and y directions orthogonally cross each other (herein, referred to as orthogonal arrangement). Further, FIG. 2B is an enlarged view showing the x-y plane.

Herein, the term "regularity sufficient" to express light reflection functions means, for example, that a plurality of the fine structures 3 made of the second material, each having the same diameter D, are regularly arranged in the x and y directions at predetermined pitches P within the first material 2 having light transmittance, where the pitch P designates a distance between the centers of adjacent fine structures 3 (in the drawings referred to below, it is defined that D represents a diameter of the fine structure 3, and P represents a pitch).

As a result of assiduous examination for the purpose of achieving the above objects, the inventors of the present invention have found the following. If the structure 1 as described above is made of at least the first and second materials having different refractive indices, and the diameter and the pitch of the fine structures 3 made of the second material securely have such regularity and periodicity that a reflection peak wave length λ of interest can be substantially expressed, then desired reflection functions based on diffraction and scattering actions can be obtained. In particular, within the visible ray range, the structure 1 made of the above-described material with regularity can eliminate the disadvantage that color is perceived as gray at a wide viewing angle (meaning that it has a dead angle) or as iridescent, which has been conventionally considered as a problem.

In the present invention, the phrase "substantially based on diffraction and scattering actions" basically means the following.

If an object, which is smaller than a wave length, is present in a uniform medium having a refractive index different from that of the object, then light is scattered by the object. If a plurality of the objects are regularly arranged at an equal interval, then each of scattered rays forms a wavefront in a fixed direction to be intensely reflected (diffracted) in the fixed direction. In the present invention, the specificity of this phenomenon is referred to as based on the "diffraction and scattering actions" (for the details, for example, refer to Light Wave Engineering, published by KYORITSU SHUPPAN CO., LTD, pages 107 to 109).

In consideration of the above description, the specificity of light reflection functions in the present invention is described referring to FIG. 1B again. Light incident on the structure 1 at an incident angle α produces 0-order reflected light at a diffraction angle β, and further, ±first order and ±second order reflected light and the like. Namely, at a fixed incident angle α, when the structure 1 is viewed or measured for reflection from the position on the reflected light side, the orders of reflected light overlap each other. As a result, reflected light is detected as one continuous spectrum as if such a spectrum were obtained by synthesizing reflection spectra based on reflected light components of the respective orders.

Since reflection peak wave lengths $\lambda_0$, $\lambda_{\pm 1}$, $\lambda_{\pm 2}$ and the like in the reflection spectrum of each order have incident angle dependency (i.e., wave lengths $\lambda_0$, $\lambda_{\pm 1}$, $\lambda_{\pm 2}$ and the like shift with a change of the incident angle) and reflection intensity dependency, light holds a predetermined hue even when the structure 1 is viewed at a different incident angle from the position on the reflected light side. Thus, its color is not viewed as gray even at a wide viewing angle (without any dead angle). Since viewing the structure at a certain angle while varying an incident angle is equivalent to viewing the structure at a fixed incident angle while changing a viewing angle (light receiving angle), the following description is mainly based on the case where the incident angle is varied.

As described above, the structure 1 for expressing light reflection functions based on "diffraction and scattering actions" in the present invention apparently differs, in view of mechanism, from a coloring body based on diffraction and interference actions and a reflector merely based on scattering actions of a colorant (that is, the colorant including a pigment itself, an object colored by the pigment or a dye, a colored object based on a molecular structure thereof or the like), which are conventionally known.

In terms of structure, the structure 1 for reflecting light according to the present invention is made of at least the first and second materials that have different refractive indices. However, the relationship of refractive indices of the materials is not particularly limited. Namely, assuming that a refractive index of the first material 2 having light transmittance is $n_1$ and a refractive index of the second material is $n_2$, the relationship between the refractive indices may be either: (1) $n_1 > n_2$; or (2) $n_1 < n_2$. The selection of the relationship greatly depends on the preference of a user as described below. Namely, in the case (1), since the material having a higher refractive index is placed on the outermost surface, the structure 1 tends to have "glossy" texture, including glittering effects. In the case (2), on the other hand, since the material having a lower refractive index is placed on the outermost surface, the structure 1 tends to have "wet" texture.

Here, it is desirable that the first and second materials having a following feature are selected in view of improvement of a reflection intensity based on diffraction and scattering actions. The feature is that a refractive index ratio between the second material (the refractive index of the second material is $n_2$) and the first material (the refractive index of the first material is $n_1$) is as large as possible. The refractive index ratio is determined as follows: the ratio is configured such as a numerator per a denominator. Comparing numerical values of the refractive indexes between both materials, the refractive index having a larger numerical value is defined as the numerator. (1) in the case: $n_1>n_2$, the refractive index ratio is described as $n_1/n_2$. Further, (2) in the case: $n_2>n_1$, the refractive index ratio is described as $n_2/n_1$. Practically, it is desired that the refractive index ratio is more than 1.01, preferably, 1.03 or more. The reason that the refractive index ratio is more than 1.01, preferably, 1.03 or more is explained in the following.

In the case where the refractive index ratio is infinitely close to 1.0, there arises a need to remarkably increase the number $N_{ym}$ in the y-axis direction of the fine structures 3 in order to obtain desired reflection functions (e.g., a reflectivity). As a result of increasing the number of fine structures 3, a thickness of the structure 1 itself for reflecting light (i.e., total structure thickness in the y-axis direction) also increases, whereby the field to which the structure 1 is applied is limited. Moreover, there also arises a demerit that the size of a spinning die itself for molding the structure 1 is remarkably increased. Therefore, it is desired that the refractive index ratio is more than 1.01, preferably, 1.03 or more.

Next, the specificity of reflection functions in the above-described structure 1 for reflecting light (the structure shown in FIGS. 1A and 1B) according to the present invention will be described in detail.

FIGS. 3 to 7 are graphs showing the results of estimation of incident angle dependency ($\alpha=0$ to 60 degrees) of a reflection spectrum in the actual optical structure. Here, Nylon 6 (Ny6) having a refractive index $n_1=1.53$ is selected as the first material 2, and polyethylene terephthalate (PET) having a refractive index $n_2=1.63$ is selected as the second material. The structure as shown in FIGS. 2A and 2B, in which a plurality of fine structures 3, each having a circular cross section, are orthogonally arranged, is used. The structure 1 is intended to obtain blue coloring, with a diameter D of the fine structure 3 being 0.19 μm, a pitch P between the fine structures 3 being 0.28 μm, and the number of rows $N_{ym}$ in the y direction ($N_{ym}$ is defined below) being 5. The reflection spectra shown in FIGS. 3 to 7 are total reflection spectra, which are basically equivalent to light reflected in various directions (herein, mainly, 0-order and ±first-order reflected light) to be accommodated in an integrating sphere in a reflection measurement method.

Figure 3:
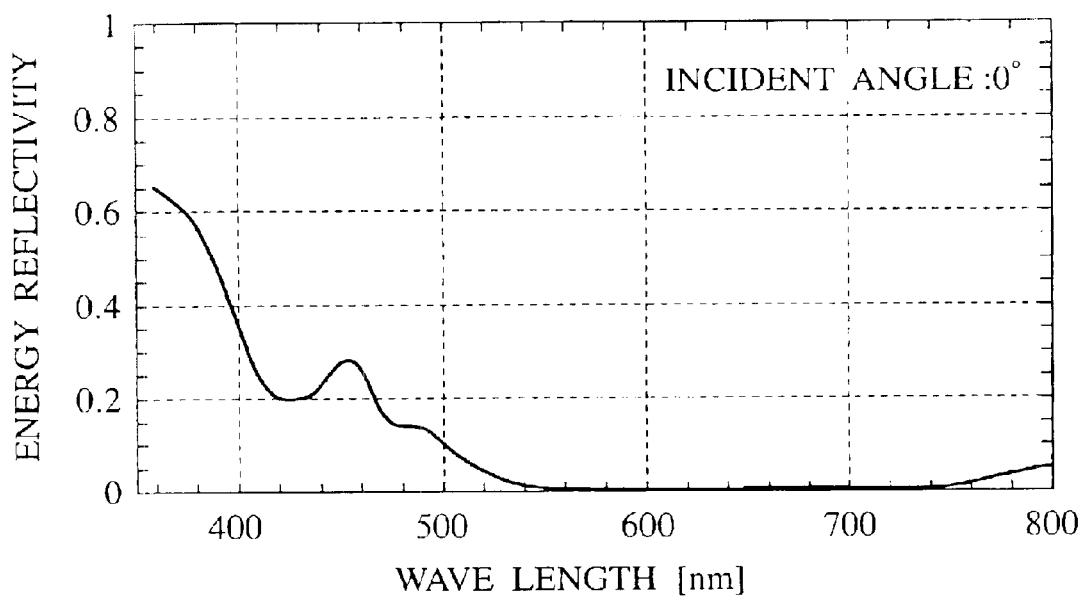
FIG. 3 is a graph showing a reflection spectrum of the structure for reflecting light shown in FIGS. 2A and 2B at an incident angle α=0 degree.
Figure 4:
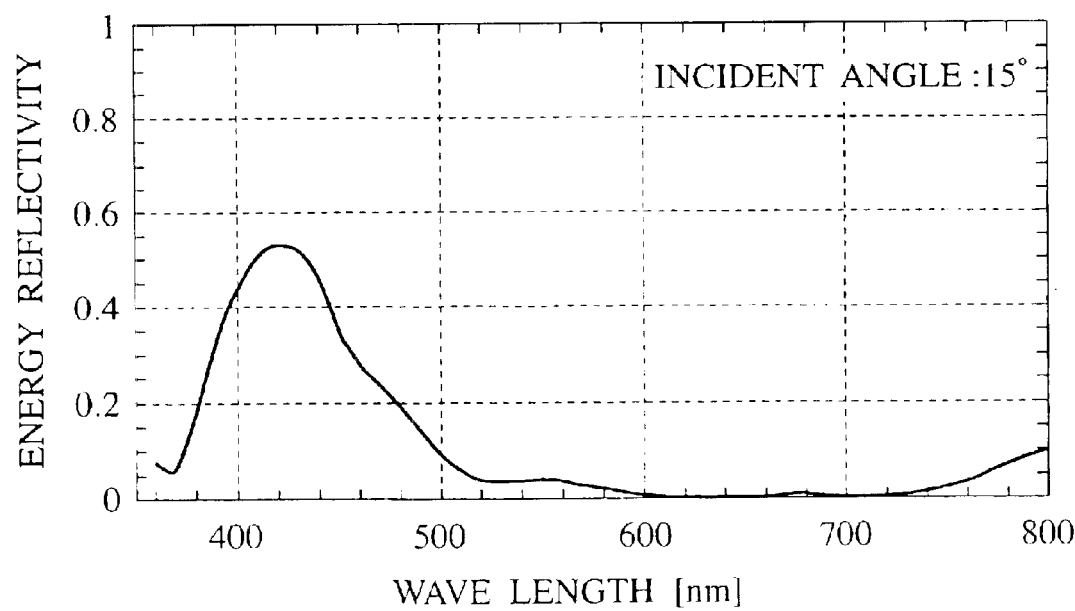
FIG. 4 is a graph showing a reflection spectrum of the structure for reflecting light shown in FIGS. 2A and 2B at an incident angle α=15 degrees.
Figure 5:
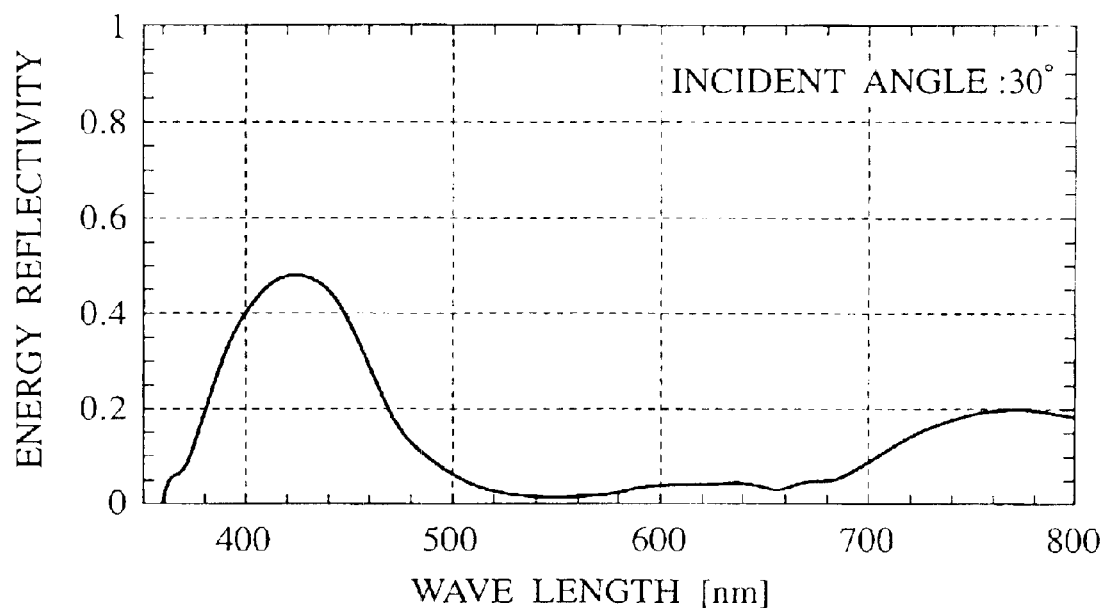
FIG. 5 is a graph showing a reflection spectrum of the structure for reflecting light shown in FIGS. 2A and 2B at an incident angle α=30 degrees.
Figure 6:
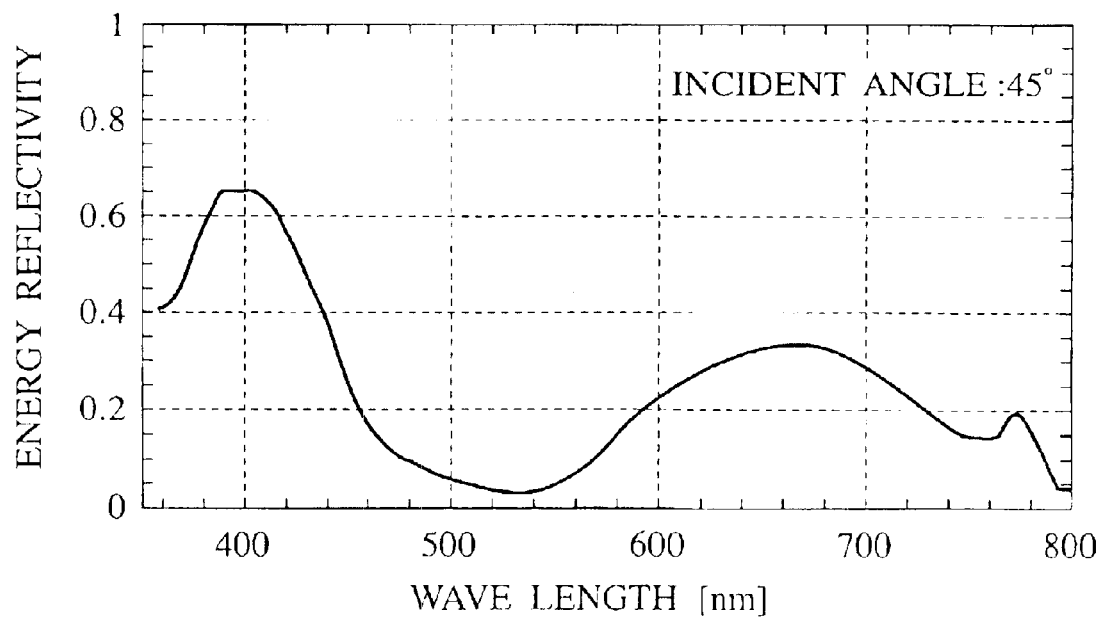
FIG. 6 is a graph showing a reflection spectrum of the structure for reflecting light shown in FIGS. 2A and 2B at an incident angle α=45 degrees.
Figure 7:
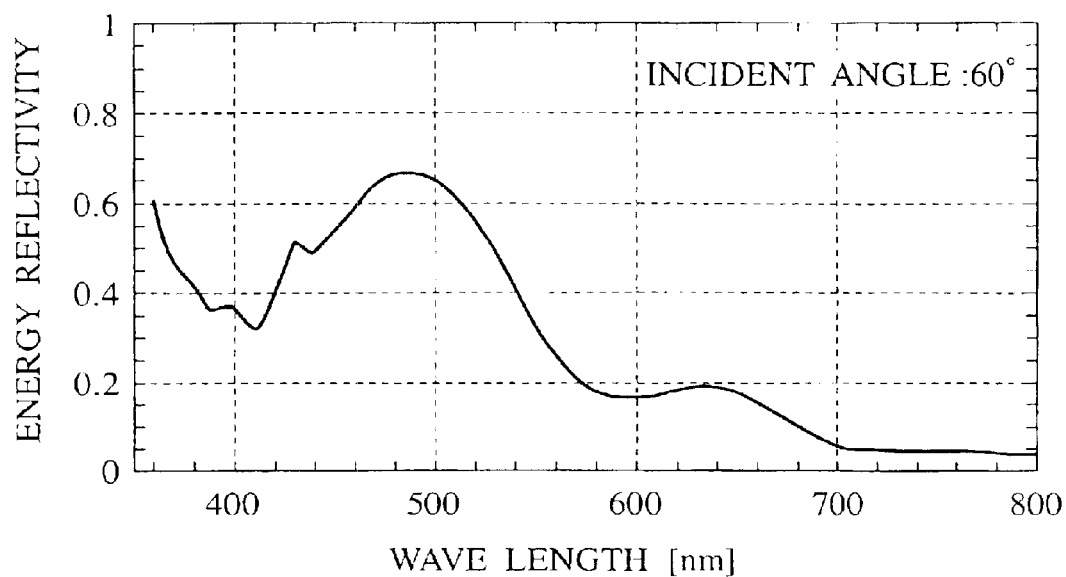
FIG. 7 is a graph showing a reflection spectrum of the structure for reflecting light shown in FIGS. 2A and 2B at an incident angle α=60 degrees.

FIG. 3 shows a reflection spectrum at an incident angle $\alpha=0$ degree, the horizontal axis representing a wave length λ[nm] and the vertical axis representing an energy reflectivity R. A main peak is observed in the vicinity of a wave length of 370 nm, and a subpeak is observed in the vicinity of a wave length of 450 nm. Due to these two peaks, generally violet color is obtained in this case. The main peak observed at an incident angle $\alpha=0$ degree is positioned in the vicinity of wave lengths of 500 nm to 430 nm even when the incident angle is increased to 15 degrees to 45 degrees, as is apparent from FIGS. 4 to 6. As a result, a large peak shift does not occur. Therefore, the tone of color is stabilized as almost violet. Further, as shown in FIG. 7, the main peak is positioned in the vicinity of a wave length of 490 nm at an incident angle $\alpha=60$ degrees, with light presenting blue to green blue color.

Although only one example is shown herein, a remarkable change in color is not caused even with a great change of the incident angle α from 0 to 60 degrees. Naturally, even at a wide viewing angle (incident angle $\alpha=60$ degrees), the phenomenon that color is perceived as gray as is observed in the conventional interference type structure does not occur.

Figure 8:
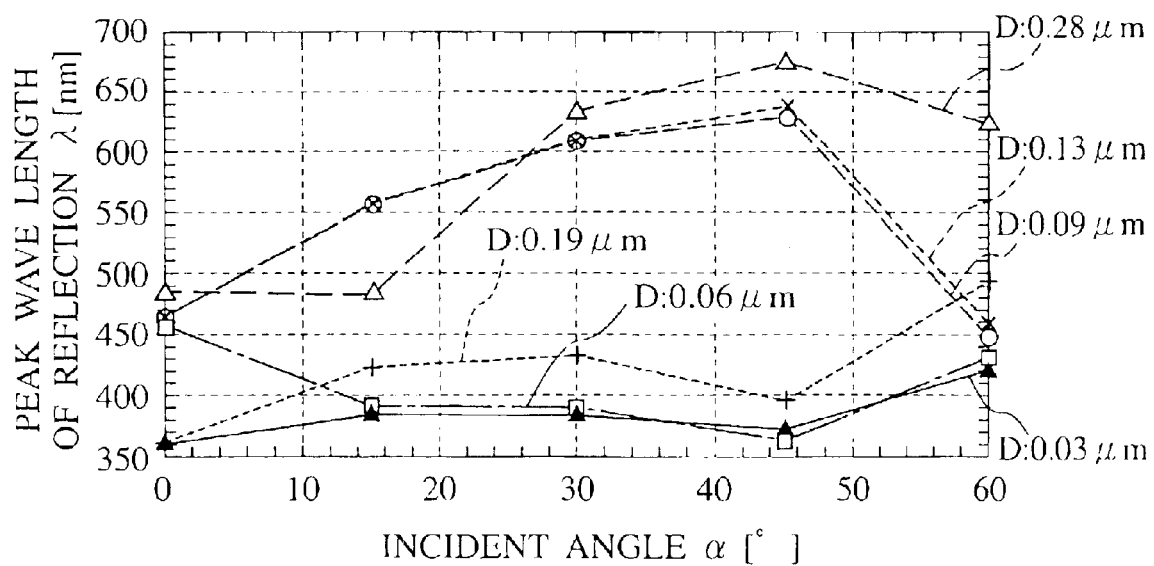
FIG. 8 is a graph showing the relationship between an incident angle α and a reflection peak wave length λ in the case where a diameter of a fine structure in the structure for reflecting light shown in FIGS. 2A and 2B is varied.

FIG. 8 shows an example of the relationship between the incident angle α and the reflection peak wave length λ in the case where the diameter D of the cylindrical body as the fine structure 3 is varied to be 0.03, 0.06, 0.09, 0.13, 0.19 and 0.28 μm, taking the diameter D as a parameter. In this example, smaller incident angle dependency of the reflection peak wave length λ is observed when the diameter D of the cylindrical body is smaller as compared with the pitch P.

Figure 9A:
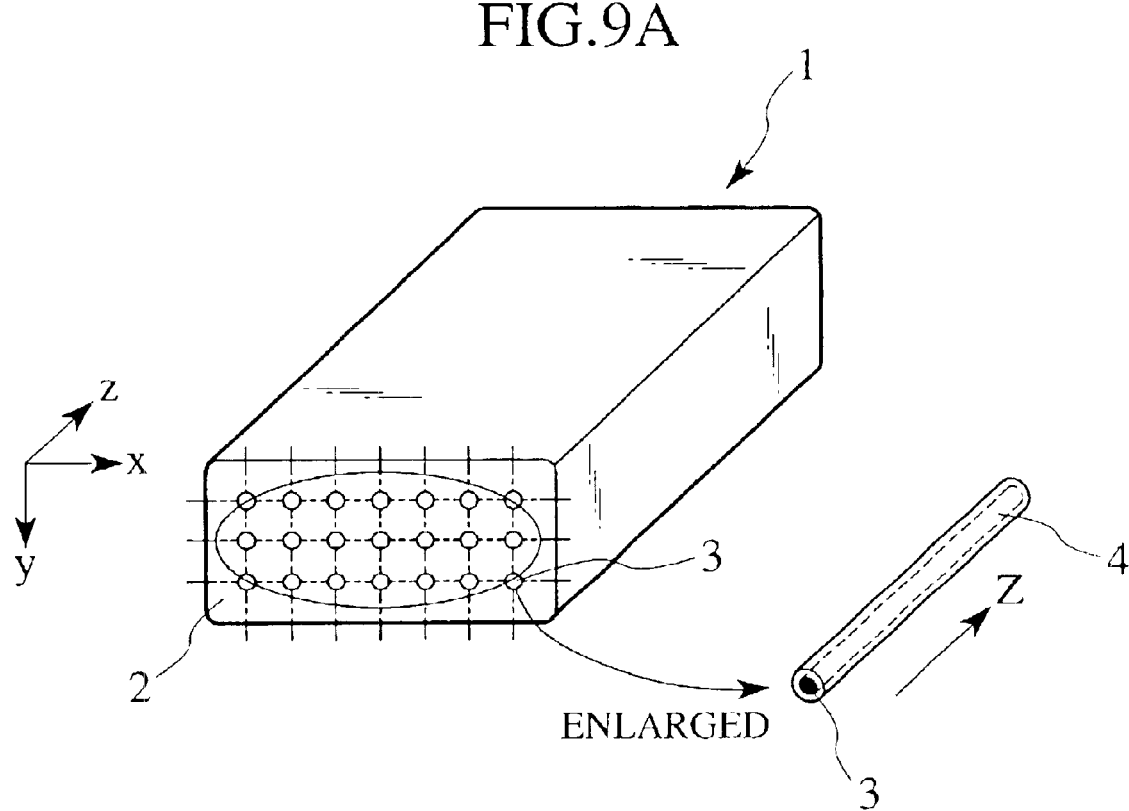
FIG. 9A is a perspective view showing a structure including sheath-core type fine structures in an orthogonal arrangement as an embodiment of the structure for reflecting light according to the present invention.
Figure 9B:
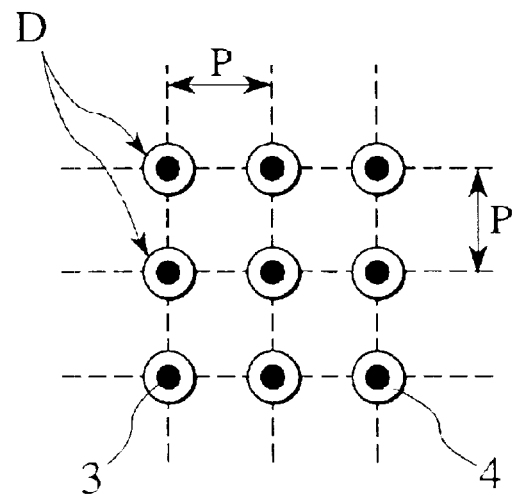
FIG. 9B is an enlarged explanatory view of an x-y plane in the structure for reflecting light shown in FIG. 9A.

In the structure 1 for reflecting light according to the present invention, as described as "the structure is made of at least the first and second materials having different refractive indices," the combination of materials is not limited to that of two materials having different refractive indices. For example, as shown in FIGS. 9A and 9B, a third material 4 may be combined with the fine structures 3 made of the second material. Namely, in the case where the third material 4 is difficult to mold or difficult to reduce to a predetermined size by a stretch treatment and the like in view of its physical properties even when the third material 4 is a high refractive index material, the fine structure 3 made of the moldable second material is covered with the third material 4 having a high refractive index to form a sheath-core type structure, thereby obtaining excellent coloring effects owing to the high refractive index material.

In order to obtain a desired reflection spectrum wave length λ, the actual diameter D, the actual pitch P and the like of the fine structures 3 made of the second material can be controlled by adjusting the ratio of the refractive index of the second material to that of the first material ($n_2/n_1$), the number N of the fine structures 3 made of the second material (see FIG. 2B: N indicating the number of rows or columns, that is, the number of the fine structures 3 made of the second material in the x direction: $N_{x1}, N_{x2} \ldots N_{xn}$, and the number of the fine structures 3 made of the second material in the y direction: $N_{y1}, N_{y2} \ldots N_{yn}$) and the like.

For example, in the combination of the above-described materials (the combination of Ny6 having a refractive index $n_1=1.53$ and polyethylene terephthalate (PET) having a refractive index $n_2=1.63$), specification sizes for obtaining blue color (reflection peak wave length λ=0.45 μm) can be generally calculated as follows: First, a distance between the centers of adjacent fine structures 3 (pitch P) can be approximately given by: P=λ/m, where a reflection peak wave length of interest is λ and an apparent refractive index is m. In the above structure, since the fine structures 3 having the refractive index $n_2$ are placed within the medium having the refractive index $n_1$, the apparent refractive index m can be calculated with a ratio of areas of the two materials which occupy the cross section of the structure 1 for reflecting light. Assuming that a ratio of the area of the medium having the refractive index $n_1$ to the area of the cross section is A/100 (%) and a ratio of the area of the fine structures 3 having the refractive index $n_2$ to the area of the cross section is B/100 (%), the apparent refractive index m is expressed as:

$$m=n_2 \times (B/100) + n_1 \times (A/100)$$

Therefore, if Ny6 having a refractive index $n_1=1.53$ and PET having a refractive index $n_2=1.63$ are respectively present at 50% of the area ratio, the pitch P is generally about 0.28 μm (=0.45 μm/(1.53+1.63)×2).

The diameter D of the fine structures 3 cannot be set in a unique manner because it is determined based on a material constituting the structure 1 for reflecting light according to the present invention, that is, the refractive index $n_2$ of the second material, the refractive index $n_1$ of the first material, and the ratio of the refractive indices ($n_2/n_1$), and further the arrangement of the fine structures 3 and the like. However, the determination of the diameter D can be generally considered as follows:

Based on the scattering theory, the relational expression:

$$\alpha = (\lambda/2\pi r)$$

is widely used as a size parameter of a particle, where r is a radius of the particle, and λ is a wave length. According to the scattering theory, it was believed that scattered light intensity greatly varies (oscillates) depending on the value of α. As a result of various examinations, however, the inventors of the present invention have found that practical light reflection functions are also expressed within the range of the size parameter α:

$$10^{-2} \leq \alpha \leq 10^3$$

by paying attention not to the mere application of the scattering theory but to the regularity (that is, diffraction and scattering actions) as described above. Herein, using actual values from FIGS. 3 to 7 described above, a value of a is calculated back. Then, from the values, that is, a radius r of the fine structure 3=(0.19 μm/2) and a reflection peak wave length λ=0.45 μm, α=about 0.75 is obtained. As a value of a more preferred size parameter α for expressing light reflection functions, a value from $10^{-1}$ to $10^2$, further preferably $10^{-1}$ to 10, is suitable. In particular, in view of light reflection functions in a visible ray to infrared ray range, a value from $10^{-1}$ to 10 is desirable.

If the size parameter α becomes smaller than $10^{-2}$, the particle size becomes extremely larger than the order of a wave length, so that it becomes difficult to mold a fibrous or film-like structure itself. On the contrary, if the size parameter α becomes greater than $10^3$, the particle size is smaller than the molecular level size, so that it becomes difficult to maintain the regularity. Moreover, the intensity of scattered light itself becomes extremely small to prevent the practical light reflection functions from being expressed.

The relational expression: 2r(=D)≦P expresses the relationship between the diameter D of the fine structures 3 and the pitch P. It is defined that the diameter D of the fine structures 3 is equal to the pitch P even at its maximum (this case means that adjacent fine structures come in point contact with each other). The diameter D exceeding the pitch P is not preferred because such a diameter causes the fusion between the fine structures and causes a change in a cross sectional structure, lowering the light reflection functions based on diffraction and scattering actions.

Regarding the number of the fine structures 3 made of the second material, it is desirable that the number $N_{xn}$ in the x direction (corresponding to the number of columns in the matrix) is such that its length is sufficiently longer than the reflection light wave length λ. It is desired that the length is ensured to be several or more times as long as the wave length λ, more preferably, about several tens of times as long as the wave length λ. In this manner, a coloring range can be ensured, improving diffraction and scattering effects.

The number $N_{ym}$ in the y direction (corresponding to the number of rows in the matrix) depends on the ratio of the refractive index of the second material $n_2$ to that of the first material having light transmittance $n_1(n_2/n_1)$. Although the number $N_{ym}$ cannot be set in a unique manner, desired light reflection functions can be obtained with several rows (about two to five rows) in the type using an air hole for the fine structure 3. However, when a material such as a polymeric material, a glass type material and a ceramic type material is used as the first material, it is desired to set the number $N_{ym}$ in the y direction generally to five or more rows, more preferably, 10 or more rows.

Next, the shape of a cross section of the fine structure 3 made of the second material and the kinds of materials which can be used as the first and the second materials will be described.

Figure 10A:
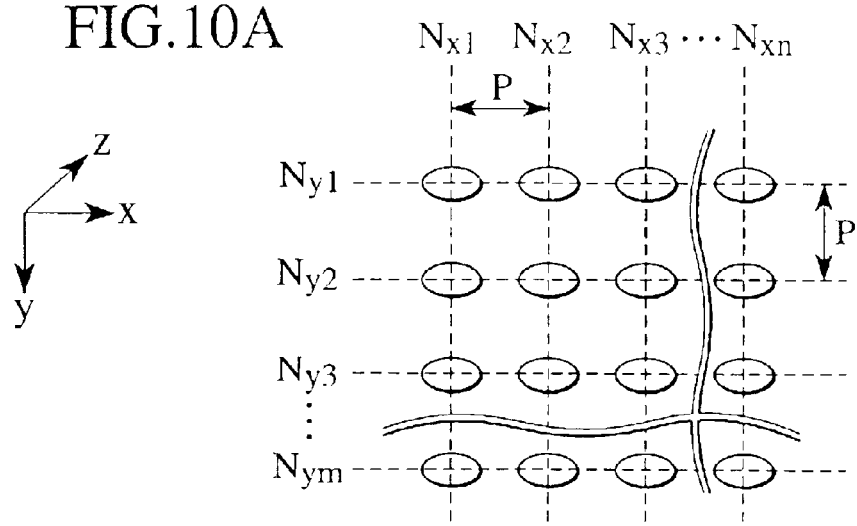
FIGS. 10A to 10C are enlarged explanatory views of an x-y plane, respectively showing the cases where a cross section of the fine structures in an orthogonal arrangement is elliptical, rectangular and polygonal, as embodiments of the structure for reflecting light according to the present invention.
Figure 10B:
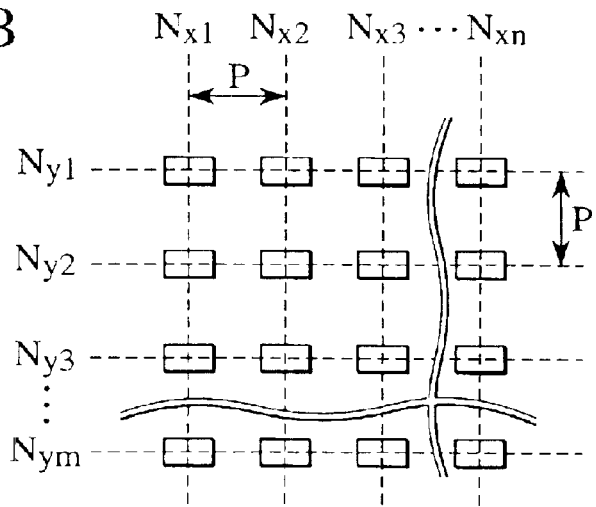
Figure 10C:
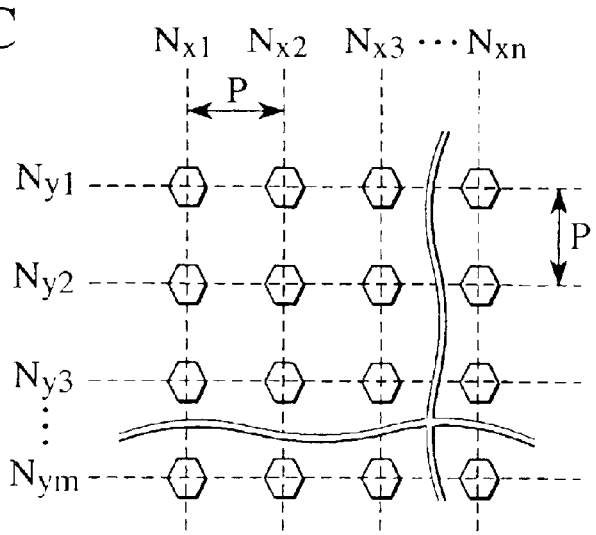
Figure 12A:
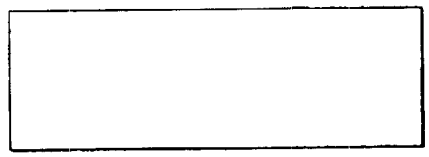
FIGS. 12A to 12G are cross-sectional views respectively showing examples of the shape of the structure for reflecting light itself according to the present invention.
Figure 12B:
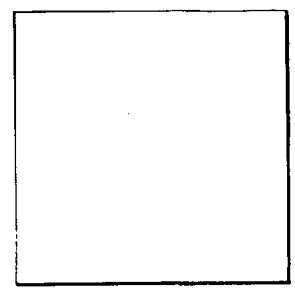
Figure 12C:
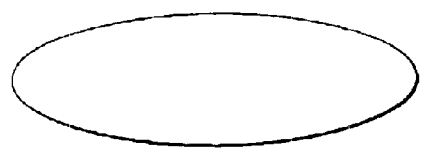
Figure 12D:
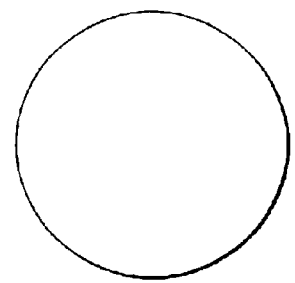
Figure 12E:
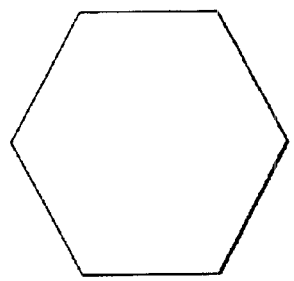
Figure 12F:
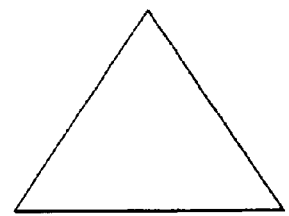
Figure 12G:
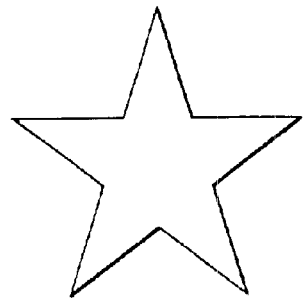

The cross sectional shape of the fine structure 3 is not limited to a circular shape as long as sufficient regularity can be two-dimensionally (in x and y directions) or three-dimensionally (in x, y and z directions) maintained. For example, as shown in FIGS. 10A to 10C, the cross section may have an arbitrary shape such as an elliptical shape, a rectangular shape and a polygonal shape. However, a circular cross section is still preferred. The reasons for this are as follows: First, with a circular cross section, the phase matching of diffracted and scattered light can be obtained when viewed from an equivalent face, that is, an equal optical path length can be obtained regardless of the direction in which the diffracted and scattered light is reflected. Second, with a circular cross section, adjacent circular cross sections can come into point contact with each other in the case where the diameter D of the circular cross section and the pitch P between the centers of the circular cross sections are equal to each other. As a result, a half width of the reflection spectrum can be advantageously increased, whereby a greater reflection intensity of diffracted and scattered light can be obtained.

The form of the fine structures 3 is not limited as long as the form has regularity not only in the x-y plane but also in the z direction. The fine structure 3 may be a three-dimensional body having various cross sectional shapes described above. As a more general shape of the fine structure 3, a spherical body as shown in FIGS. 11A and 11B is given as an example.

The cross sectional shape of the structure 1 for reflecting light itself, made of at least the first and second materials, is not limited at all. As shown in FIGS. 12A to 12G, it is obvious that the cross sectional shape can be appropriately selected as a circle, an ellipsoid, a rectangle, a star shape, a polygon and the like, depending on the purpose and the application. For example, as described below, in the case where the structure 1 for reflecting light is used in the form of flakes for painting, a rectangular cross section (refer to FIGS. 12A and 12B) and a flat cross section (refer to FIG. 12C) are preferred to a circular cross section (refer to FIG. 12D), from a point of view that there is a stronger probability that the diffraction and scattering faces of the flakes are uniformly arranged within a paint coating with respect to incident light.

Figure 13A:
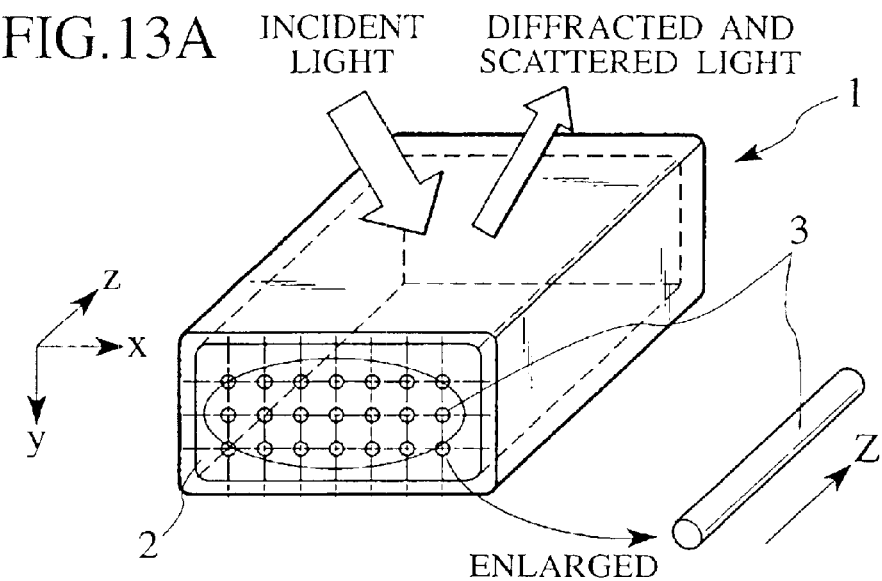
FIG. 13A is a schematic view for illustrating a direction and a site in which light reflection functions are expressed, in the case where a light incident direction on the structure of the present invention is an x-z plane.
Figure 13B:
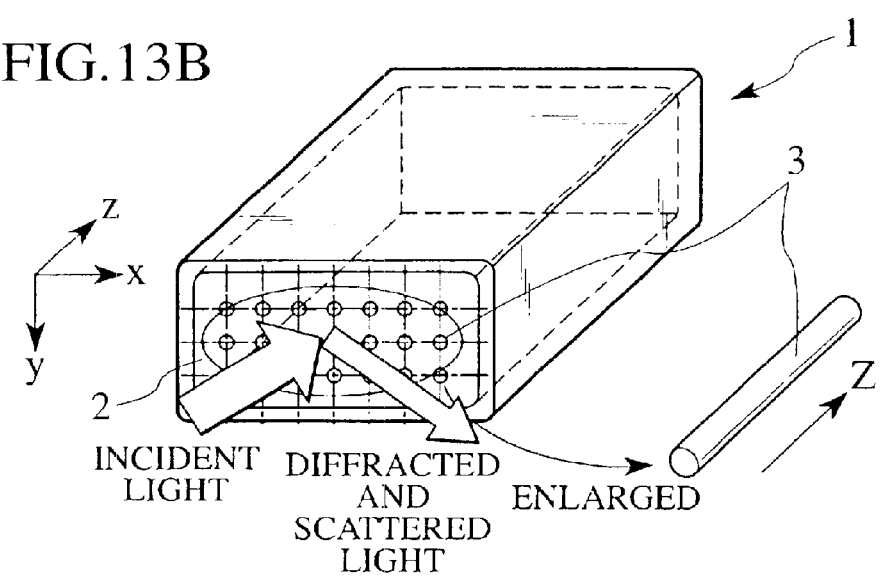
FIG. 13B is a schematic view for illustrating a direction and a site in which light reflection functions are expressed, in the case where the light incident direction on the structure of the present invention is an x-y plane.
Figure 13C:
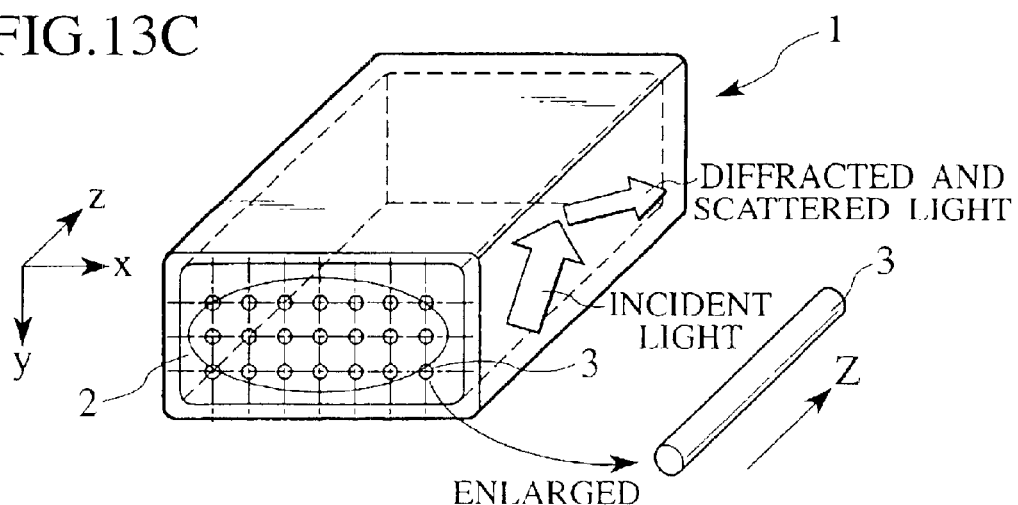
FIG. 13C is a schematic view for illustrating a direction and a site in which light reflection functions are expressed, in the case where the light incident direction on the structure of the present invention is a y-z plane.

The structure 1 for reflecting light of the present invention includes the fine structures 3 which are arranged in a cross section (x-z plane) with regularity sufficient to express light reflection functions based on diffraction and scattering actions, for example, as shown in FIGS. 13A to 13C. Thus, the structure 1 for reflecting light also has a great characteristic which cannot be obtained with a conventional coloring structure as follows: that is, the structure 1 of the present invention is constituted so as to express great light reflection functions basically in the case where light is incident on the x-z plane. However, even in the case where light is incident on the x-y plane (cross-sectional direction) or on the y-z plane (side face), light reflection functions can also be almost omnidirectionally realized though a reflection efficiency is inferior to that in the case where light is incident on the x-z plane.

Particularly, in the case where the fine structure 3 is a continuous uniform body such as a cylindrical body or a spherical body in the structure 1 and the regular arrangement of the fine structures 3 is orthogonal arrangement (quadrangular arrangement), reflection functions are expressed even when light is incident on the y-z plane (side face) (refer to FIG. 13C). This specificity signifies that, for example, when the structure 1 is used as a warp or/and a weft to form a textile fabric, color is generally exhibited omni-directionally even if the structure 1 (thread) is twisted (conventional textile fabrics which color based on interference and diffraction actions have a drawback that color is perceived as gray when twisted).

In the case where the structure (thread) is chipped into pieces (platelets) in the order of several mm to several tens of $\mu$m so as to be used as flakes for painting in a paint coating, a normal interference coloring flake is formed to have an extremely flat shape, whereby the flakes should be colored in advance so that the flakes are spontaneously oriented or the flakes color even when they are randomly oriented. On the other hand, in the case of the flakes of the present invention, the flakes have a great advantage in that coloring can be achieved even without precise control of the orientation of the flakes (see FIG. 14).

A light transmitting material described in the present invention is not particularly limited as long as it has substantially light transmittance in any one of a visible ray range, an infrared ray range and an ultraviolet ray range. The light transmitting material may be formed by any of solid, liquid, and gas. In order that reflection functions of light based on diffraction and scattering actions are expressed, the reflection at the interface between the first material 2 and the second material 3 is important. Therefore, it is desirable that the first material 2 allows at least a part of incident light to be transmitted therethrough. In addition, assuming that the second material 3 has also light transmittance and the structure 1 is a coloring structure for reflecting a specific wave length of a visible ray, the following specificity is also expressed.

Namely, the commercial value that a hue differs in the cases where a viewer sees the structure 1 from the position on the incident light side (i.e., the viewer sees reflected light) and where the viewer sees the structure 1 from the position opposite to the side of the incident light (i.e., the viewer sees transmitted light) can also be added.

The coloring based on a molecular structure is allowed or the artificial coloring with a colorant such as a pigment and a dye is allowed as long as at least the first material 2 has substantially light transmittance. The multiplier effect (combined effect) which is generated by such coloring functions and the reflection functions of light based on diffraction and scattering actions of the present invention can add unprecedented unique color tones and textures. Further, a proper amount of a material for substantially reflecting an ultraviolet ray or an infrared ray can be added to an individual fine structure 3 made of the second material to improve the reflection properties for an ultraviolet ray or an infrared ray. Moreover, a proper amount of a material for absorbing an ultraviolet ray or an infrared ray can be added, thereby blocking an ultraviolet ray or an infrared ray and providing heat-retaining effects. As a specific material, the material is preferred to be present in form of fine particles; for example, oxides obtained by oxidizing Ti, Zr, Al, Sb, Zn, P and the like can be given as examples of the material.

As a material substantially having light transmittance, it is desirable that at least the first material is formed of one or more materials selected from the group consisting of polymers, glasses and ceramics. As glass materials, for example, a normal crown glass, a flint glass, an E-glass, an S-glass, a quartz glass and the like can be given as examples. As ceramic materials, for example, $AL_2O_3$, BeO, CaO and the like can be given as examples. For application to a larger number of products, polymer materials having light transmittance are more desirable for decorative and high-design applications where the material is used as a textile fabric, a film or a molded object, for reflecting an ultraviolet ray and an infrared ray and for achieving the coloring in the visible ray range without any dead angle, or as flakes in form of minute chips (platelets) obtained by cutting the material to have a predetermined length.

As polymer materials, it is desirable that at least one of the first material and the second material is, among various polymers such as a thermoplastic resin, a thermally curable resin and an ultraviolet-curing resin, a simple polymer of polyesters, polyamides, polyolefins, vinyls, polyetherketones, polysulfides, fluorines or polycarbonates, a blend thereof, or a copolymer thereof, in view of moldability, high processability, cost and the like.

In addition, the polymer materials may employ a liquid crystal polymer, whereby an orientation of the structure is improved.

Figure 15:
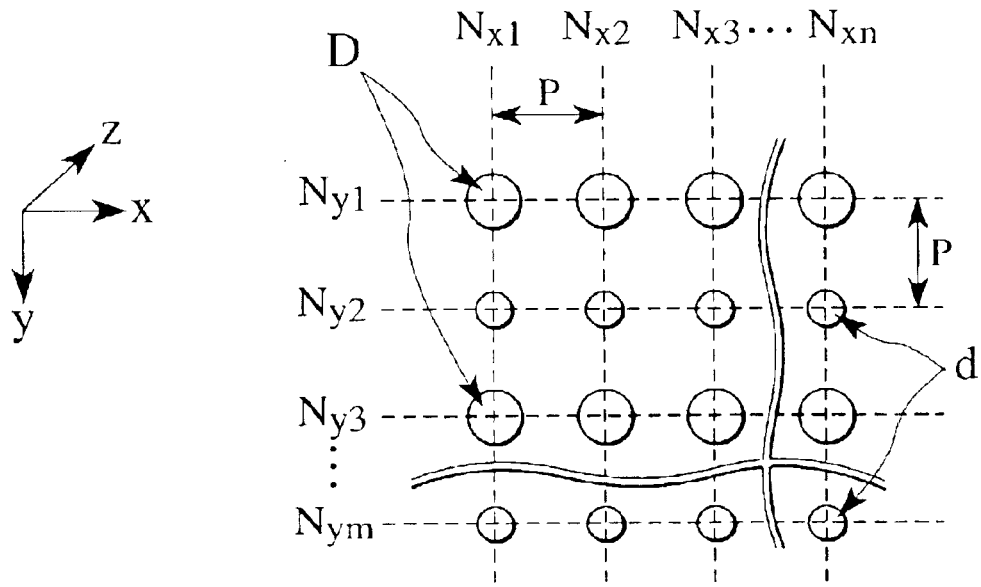
FIG. 15 is an enlarged explanatory view of an x-y plane, showing an example where a diameter of cylindrical fine structures in an orthogonal arrangement is varied in every row, as an embodiment of the structure for reflecting light according to the present invention.

The variations of a cross sectional structure with "sufficient regularity" will be further described below. FIG. 15 shows the case where the pitches P in the x direction and the y direction are equal to each other but the diameter D of the fine structures 3 made of the second material in the odd-numbered rows ($N_{y1}$, $N_{y3}$, . . . ) differs from that of the fine structures 3 in the even-numbered rows ($N_{y2}$, $N_{y4}$ . . . ) in the fine structures 3 made of the second material which form the fine structure group.

Figure 16:
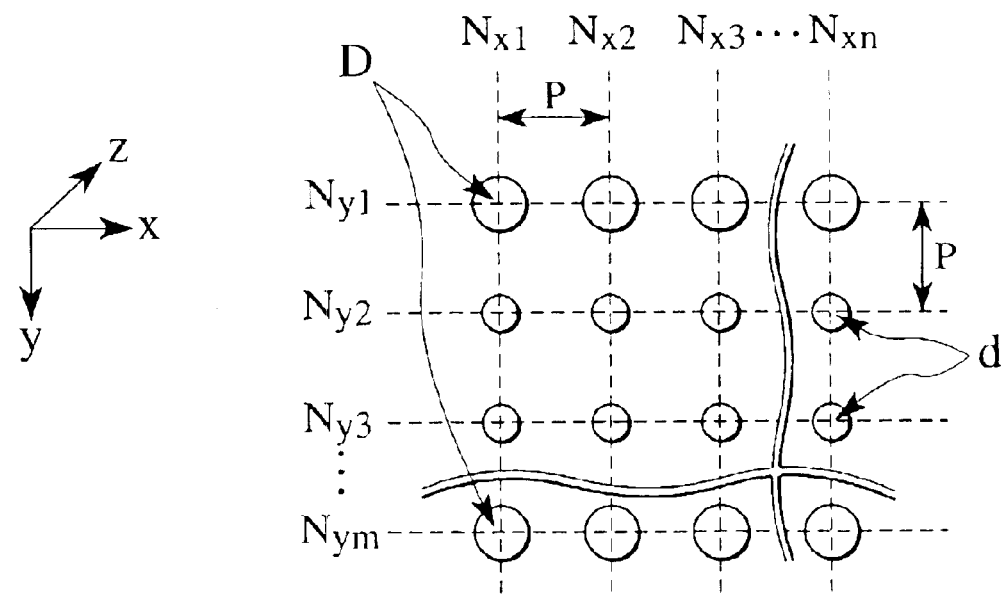
FIG. 16 is an enlarged explanatory view of an x-y plane, showing an example where the diameter of the cylindrical fine structures in an orthogonal arrangement is varied in every two rows, as an embodiment of the structure for reflecting light according to the present invention.

FIG. 16 shows the case where, regarding the group of fine structures positioned in the rows $N_{y1}$ to $N_{y4}$ as a single unit, the pitch P is the same for all the rows, the diameters D of the fine structures 3 positioned in the rows $N_{y1}$ and $N_{y4}$ are identical, the diameters D of the fine structures 3 positioned in the rows $N_{y2}$ and $N_{y3}$ are identical, and the former diameter and the latter diameter differ from each other.

Figure 17A:
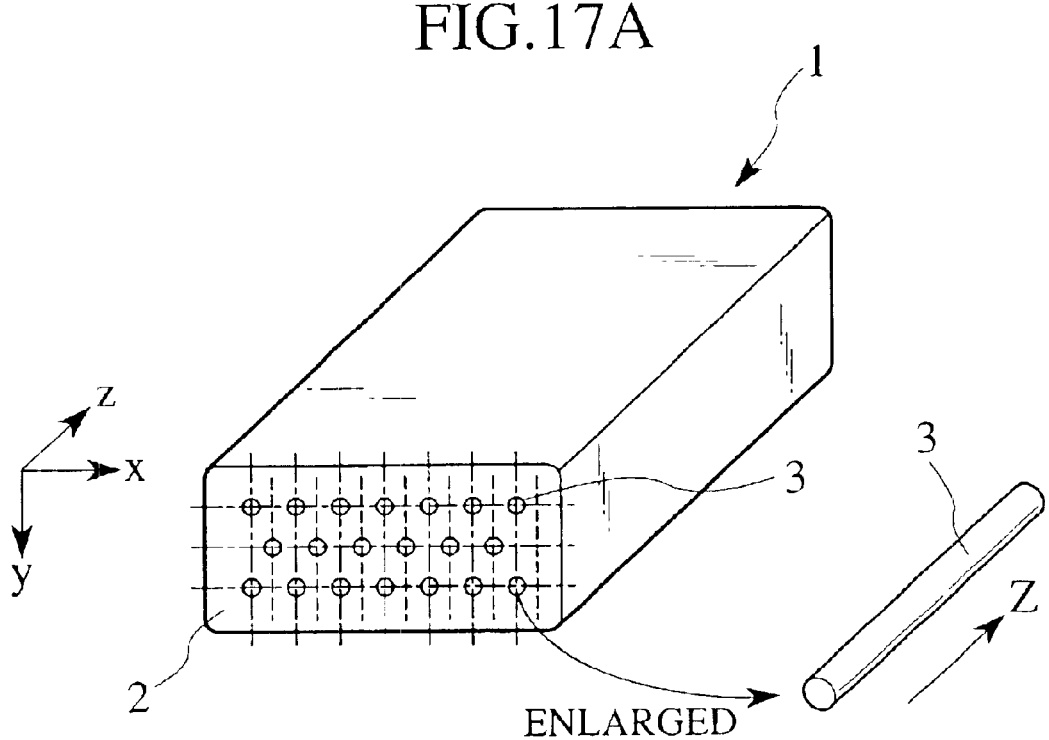
FIG. 17A is a perspective view showing a structure including fine structures in a hexagonal arrangement, each having a circular cross section, as an embodiment of the structure for reflecting light according to the present invention.
Figure 17B:
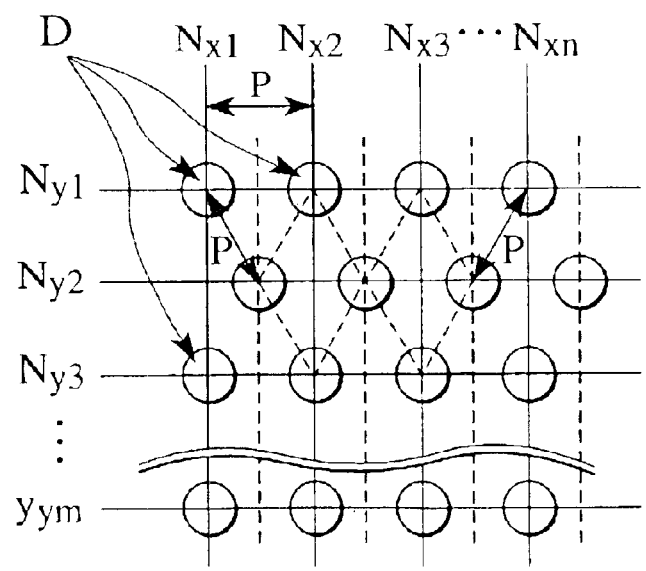
FIG. 17B is an enlarged explanatory view of an x-y plane in the structure for reflecting light shown in FIG. 17A.

FIGS. 17A and 17B show the case where the fine structures 3, which are regularly positioned at the pitch P in the x direction in the odd-numbered rows (or the even-numbered rows), and the fine structures 3, which are positioned at the same pitch P as described above in the x direction in the even-numbered rows (or the odd-numbered rows), are shifted by a half pitch, and a distance between the closest fine structures that are placed in the even-numbered row and the odd-numbered row is equal to the pitch P. Namely, FIGS. 17A and 17B show the hexagonal arrangement (in this case, the fine structures 3 positioned in the odd-numbered rows and the fine structures 3 positioned in the even-numbered rows are placed at the same pitch) which can be frequently observed from the crystallographical point of view.

FIGS. 18A to 18C show the triangle regular arrangement of the group of the fine structures (cylindrical bodies) in the x-y plane (the fine structures having the same diameter are in the triangle arrangement). FIGS. 19A to 19C show the case where a diameter of a cylindrical body at the vertex differs from that of cylindrical bodies placed at the other two points.

Figure 20:
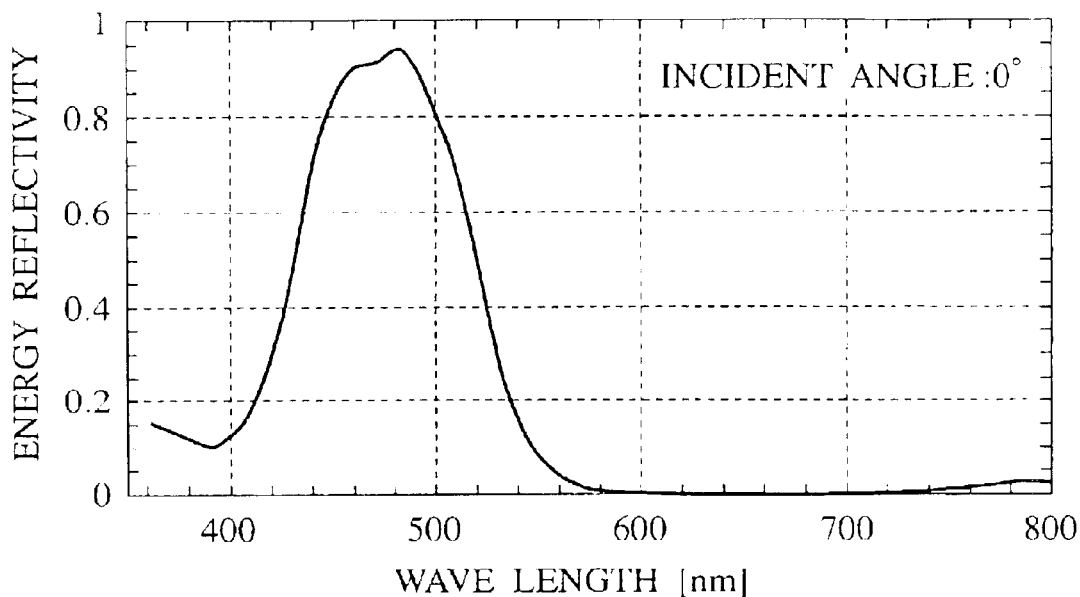
FIG. 20 shows a reflection spectrum in the case where an incident angle is 0 degree for the structure shown in FIGS. 19A to 19C.
Figure 21:
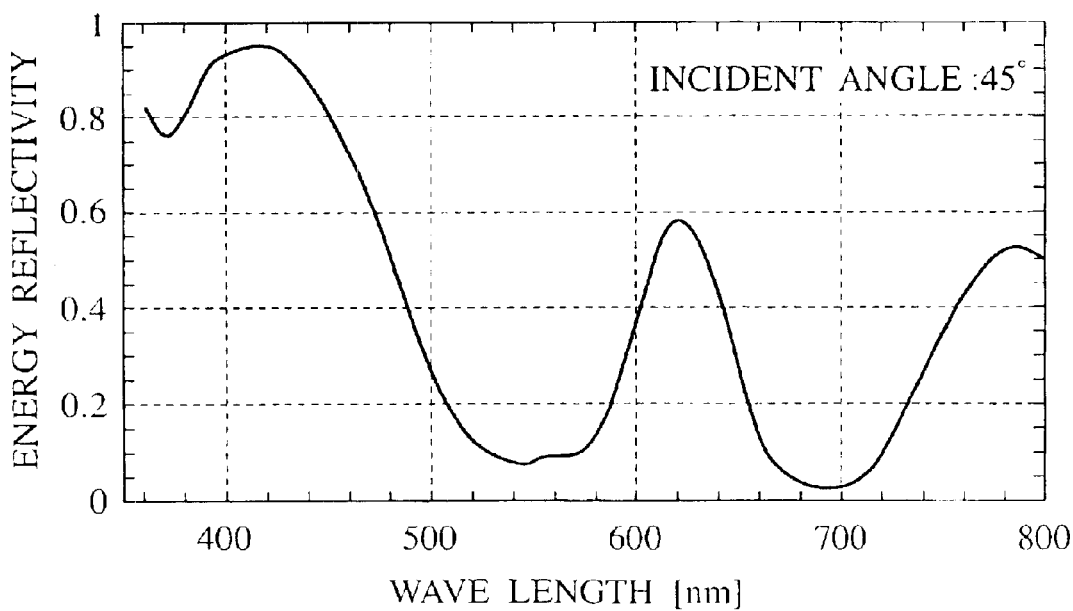
FIG. 21 shows a reflection spectrum in the case where an incident angle is 45 degrees for the structure shown in FIGS. 19A to 19C.
Figure 22:
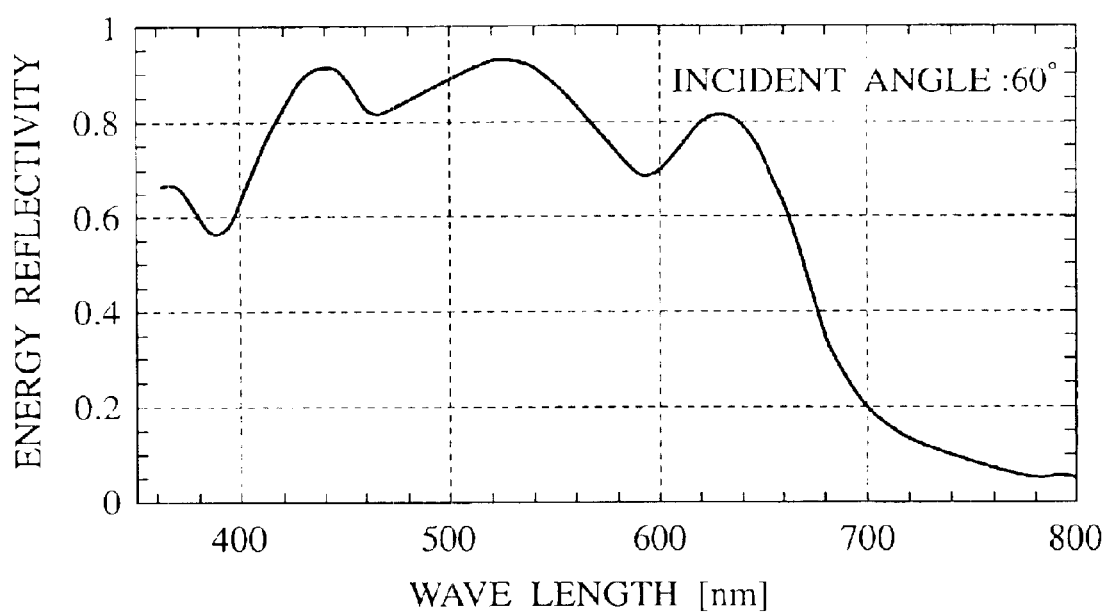
FIG. 22 shows a reflection spectrum in the case where an incident angle is 60 degrees for the structure shown in FIGS. 19A to 19C.

FIGS. 20 to 22 show reflection spectra with an incident angle being varied to 0 degree, 45 degrees and 60 degrees, respectively, in the triangle arrangement (the configuration shown in FIGS. 19A to 19C: cylindrical bodies have different diameters). Here, a refractive index ratio ($n_2/n_1$) of a plurality of cylindrical bodies made of the second material to the first material surrounding the cylindrical bodies is fixed to be 1.065. A pitch P between the cylindrical bodies which are positioned at the vertices (when viewed from the incident light side) within a cross section, contributing to the determination of a coloring wave length λ, is 0.44 μm, a diameter of such a cylindrical body is 0.10 μm, a pitch $P_1$ between the other two cylindrical bodies constituting the base of the triangle is 0.22 μm, a diameter of such a cylindrical body is 0.08 μm, a pitch $P_2$ between adjacent triangles, considering a triangle formed by the cylindrical bodies as a unit (the smallest structure of regularity), is 0.21 μm, and the number N of rows of units in the y direction, considering the triangle as a unit, is 11. In this case, as is apparent from the drawings, an energy reflectivity is extremely high, i.e., about 0.9. Moreover, even when an incident angle is varied from 0 degree to 60 degrees, it is noticed that color is not perceived as gray, maintaining a certain color.

Figure 25:
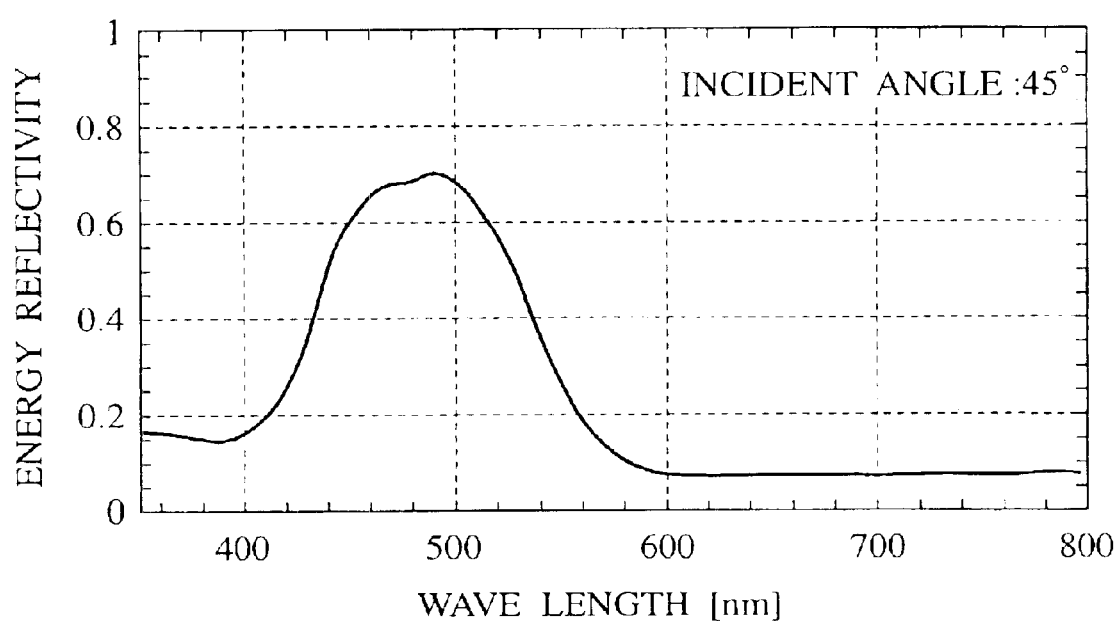
FIG. 25 shows a reflection spectrum at an incident angle of 45 degrees for the structure shown in FIGS. 23A and 23B.

The inventors of the present invention have also assiduously examined reflection spectra in the case where the arrangement of cylindrical bodies in the x-y plane is pentagonal, octagonal and further polygonal (nonagonal or more) in addition to the above-described triangle arrangement. FIGS. 23A, 23B, 24A and 24B show examples of the structure of a pentagonal regular arrangement. FIG. 25 shows an example of a reflection spectrum (at an incident angle of 45 degrees) in the case of the structure illustrated in FIGS. 23A and 23B. Also in this case, a reflection peak is observed in a blue region though the reflection spectrum is slightly broad as compared with the triangle arrangement.

As in the above description, the refractive index ratio of a plurality of cylindrical bodies made of the second material and the first material surrounding the cylindrical bodies is also fixed to 1.065 in this case. A pitch $P_{x1}$ between the cylindrical bodies which are positioned at the vertices, contributing to the determination of a coloring wave length λ, is 0.42 μm, a diameter of such a cylindrical body is 0.10 μm, a diameter of cylindrical bodies at two points of the pentagon (other than the points constituting the vertex and the base) is 0.08 μm, a pitch $P_{y1}$ in the y direction is 0.12 μm, a pitch $P_{y2}$ between adjacent pentagons, considering a pentagon as a unit, is 0.24 μm, and the number N of rows of units in the y direction is 11.

FIGS. 26A to 28B show examples of a structure of an octagonal regular arrangement of cylindrical bodies, respectively. In any case of the triangle arrangement, the pentagonal arrangement, and the octagonal arrangement, it is the pitch $P_{x1}$ between the cylindrical bodies positioned in the closest face to the incident light side that determines a coloring wave length (reflection peak wave length) λ, as described above.

As described above, the arrangement of the group of fine structures is in a polygonal form with ensured regularity of arrangement, paying attention to the pitch $P_{x1}$ between the fine structures (cylindrical bodies) positioned in the closest face to the incident light side that determines a coloring wave length (reflection peak wave length) λ, whereby light reflection functions based on diffraction and scattering actions can be sufficiently expressed.

Figure 29:
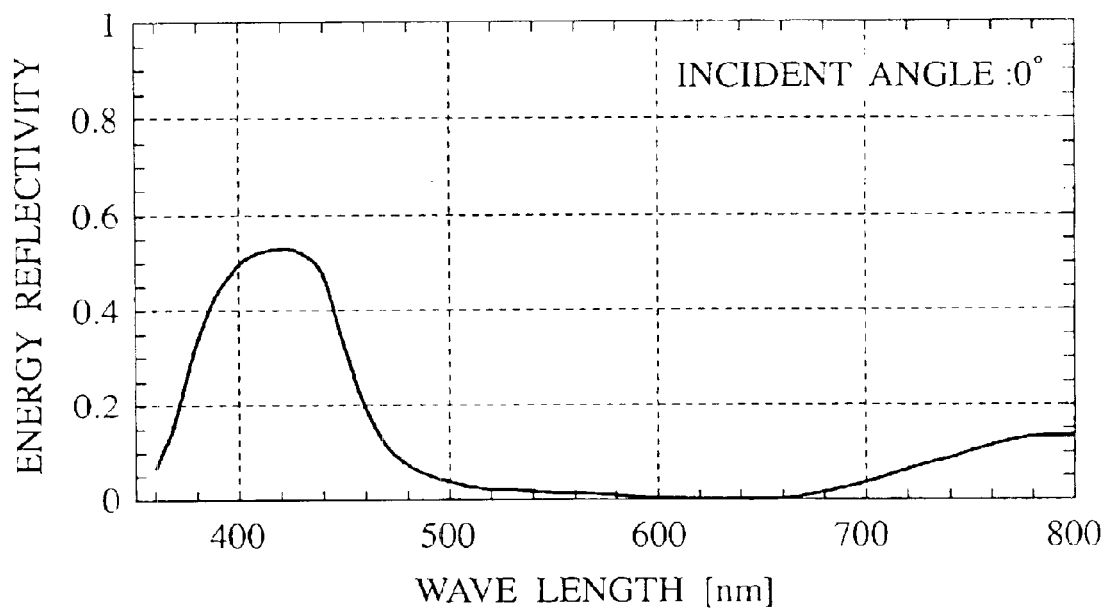
FIG. 29 is a graph showing a reflection spectrum at an incident angle of 0 degree for the structure shown in FIGS. 17A and 17B.
Figure 30:
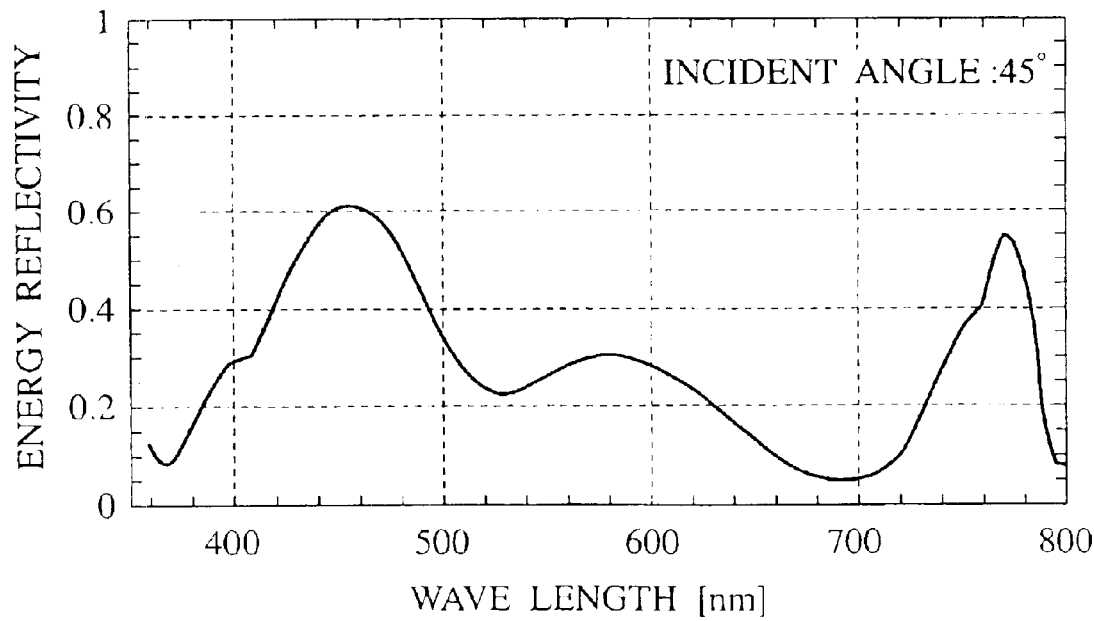
FIG. 30 is a graph showing a reflection spectrum at an incident angle of 45 degrees for the structure shown in FIGS. 17A and 17B.
Figure 31:
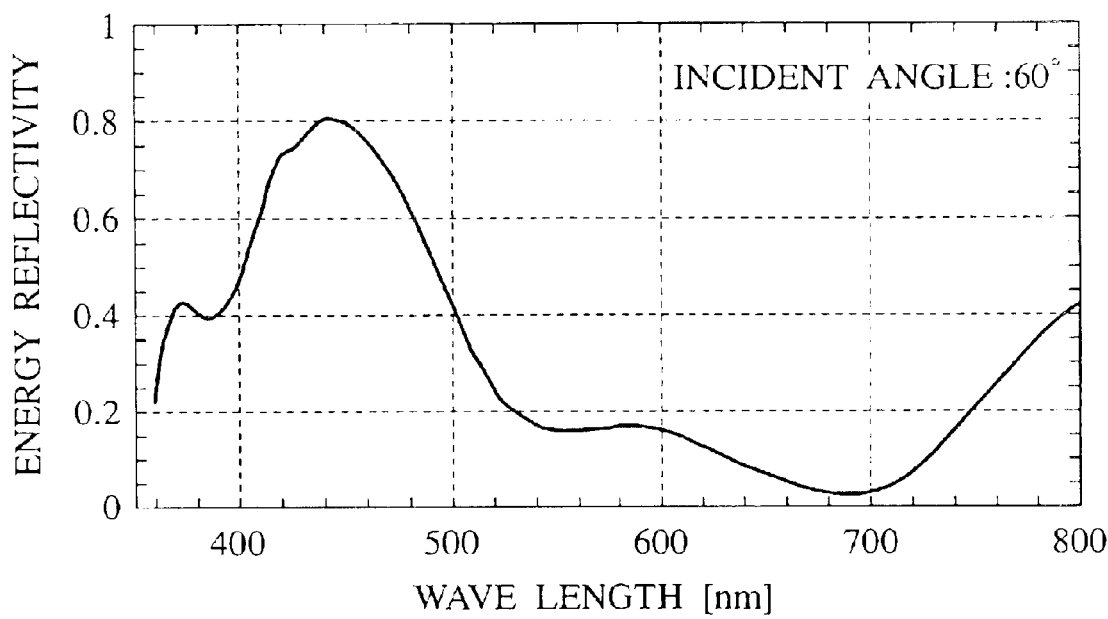
FIG. 31 is a graph showing a reflection spectrum at an incident angle of 60 degrees for the structure shown in FIGS. 17A and 17B.

FIGS. 29 to 31 show reflection spectra in the above-described hexagonal arrangement as an example. Herein, using Ny6 and PET described above as the first material and the second material, respectively, an incident angle α is varied to 0 degree, 45 degrees and 60 degrees, where a diameter D of a cylindrical body (fine structure)=0.19 μm, a pitch P=0.28 μm, and the number of rows of the groups of fine structures $N_{ym}$=5. Main peak wave lengths λ at an incident angle α=0 degree, 45 degrees and 60 degrees are respectively about 430 nm, about 460 nm and about 450 nm. From this result, it is understood that a large peak shift is not observed even with a great change of the incident angle. Thus, blue is generally presented as a color.

As described above, with the hexagonal arrangement of the fine structures 3, color is not perceived as gray even at a wide viewing angle, as in an interference type coloring structure. Further, it is understood that stable color is presented (a great change in color is not generated, as can be observed in an interference type coloring structure). In the above-described examples, the fine structures 3 made of the second material with a diameter D and a pitch P are regularly arranged at certain intervals (spaces) with the first material 2 having light transmittance interposed therebetween so that the fine structures 3 do not contact with each other.

Figure 32:
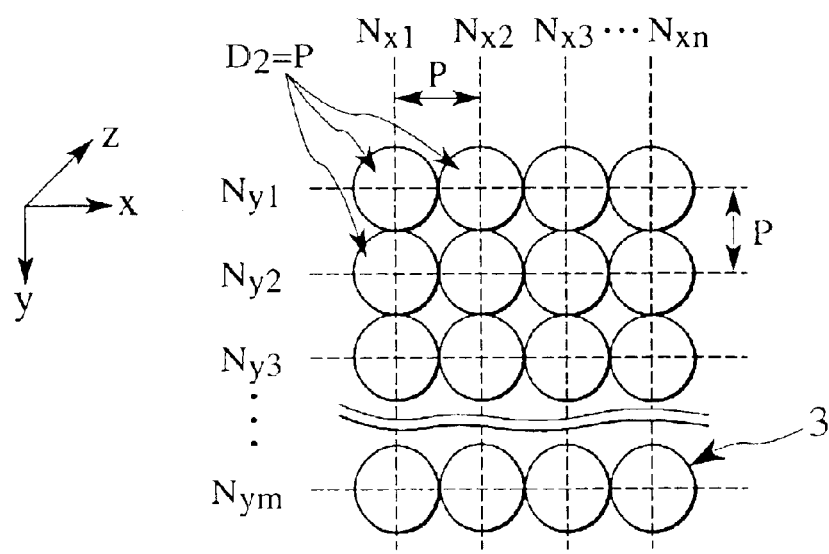
FIG. 32 is an enlarged explanatory view of an x-y plane, showing an example where cylindrical fine structures arranged in an orthogonal form are in contact with each other, as an embodiment of the structure for reflecting light according to the present invention.
Figure 33:
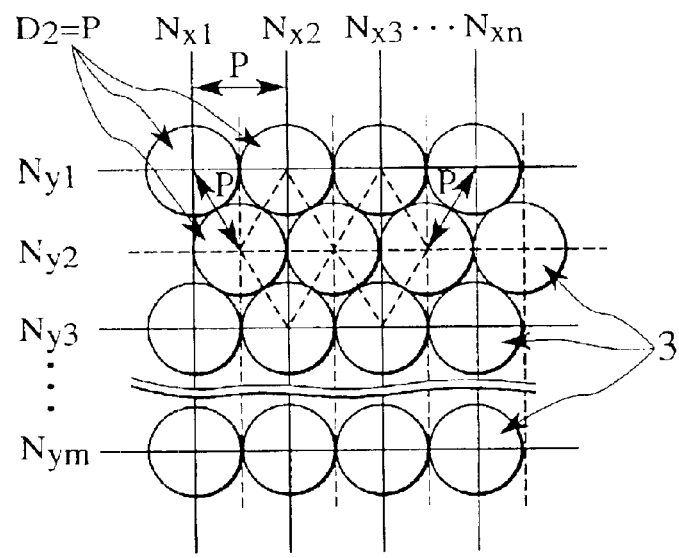
FIG. 33 is an enlarged explanatory view of an x-y plane, showing an example where cylindrical fine structures arranged in a hexagonal form are in contact with each other, as an embodiment of the structure for reflecting light according to the present invention.

Meanwhile, when reflection functions of light based on diffraction and scattering actions are to be substantially expressed, the fine structures 3 made of the second material are not necessarily arranged at certain intervals. The inventors of the present invention have found that the fine structures 3 may be adjacent or may contact with each other as long as the fine structures 3 maintain the regularity with the diameter D and the pitch P. For example, FIG. 32 illustrates a cross-sectional structure in which the fine structures 3 are in point contact with each other, in the orthogonal arrangement shown in FIGS. 2A and 2B. FIG. 33 illustrates a cross-sectional structure in which the fine structures 3 are similarly in point contact with each other, in the hexagonal arrangement shown in FIGS. 17A and 17B.

Figure 34:
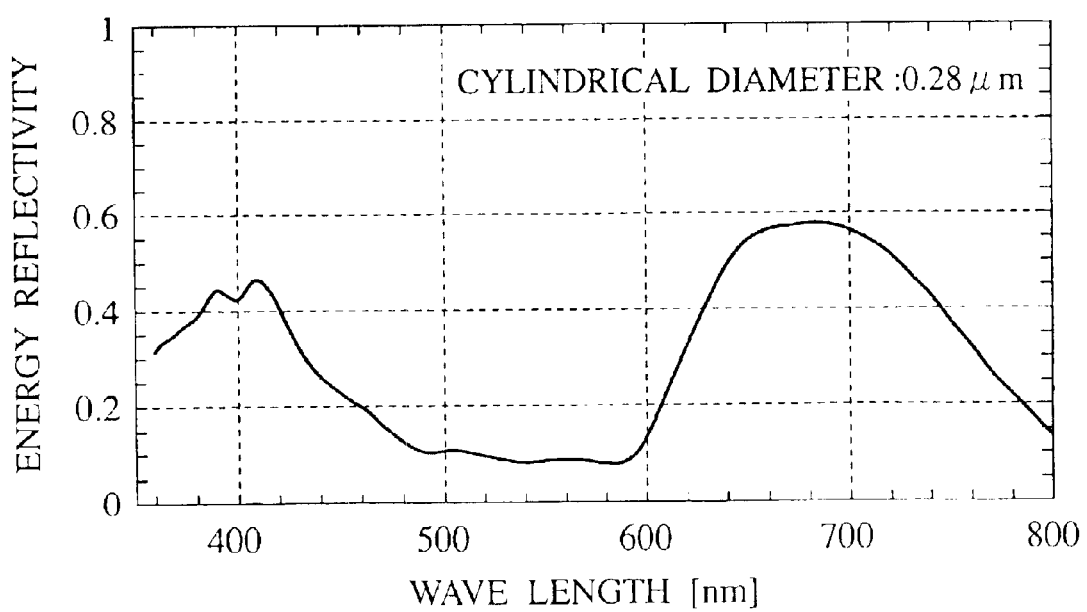
FIG. 34 is a graph showing a reflection spectrum of the structure for reflecting light shown in FIG. 21 when the diameter of a cylindrical fine structure is 0.28 μm.
Figure 35:
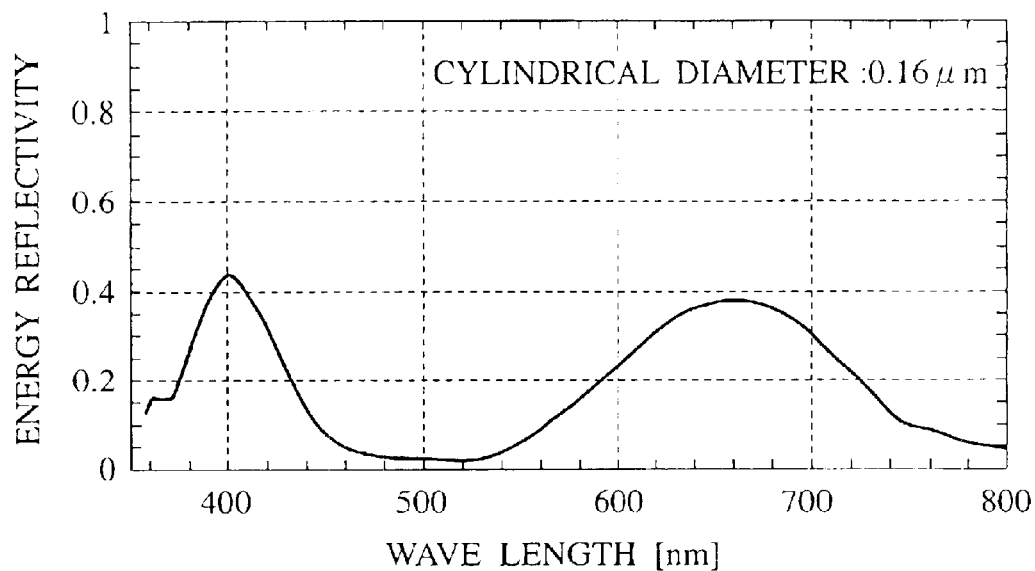
FIG. 35 is a graph showing a reflection spectrum of the structure for reflecting light shown in FIG. 21 when the diameter of a cylindrical fine structure is 0.16 μm.
Figure 36:
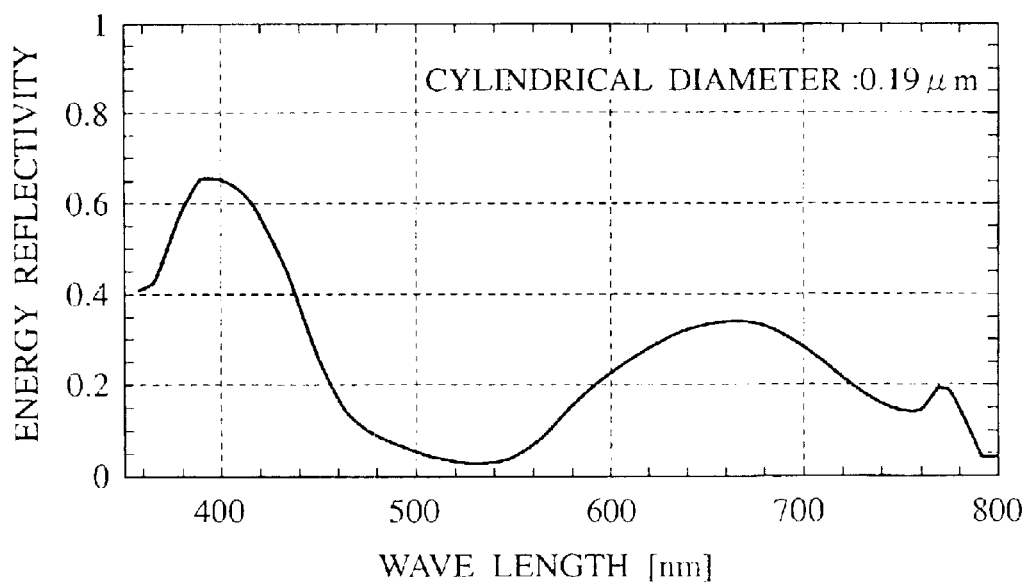
FIG. 36 is a graph showing a reflection spectrum of the structure for reflecting light shown in FIG. 21 when the diameter of a cylindrical fine structure is 0.19 μm.
Figure 37:
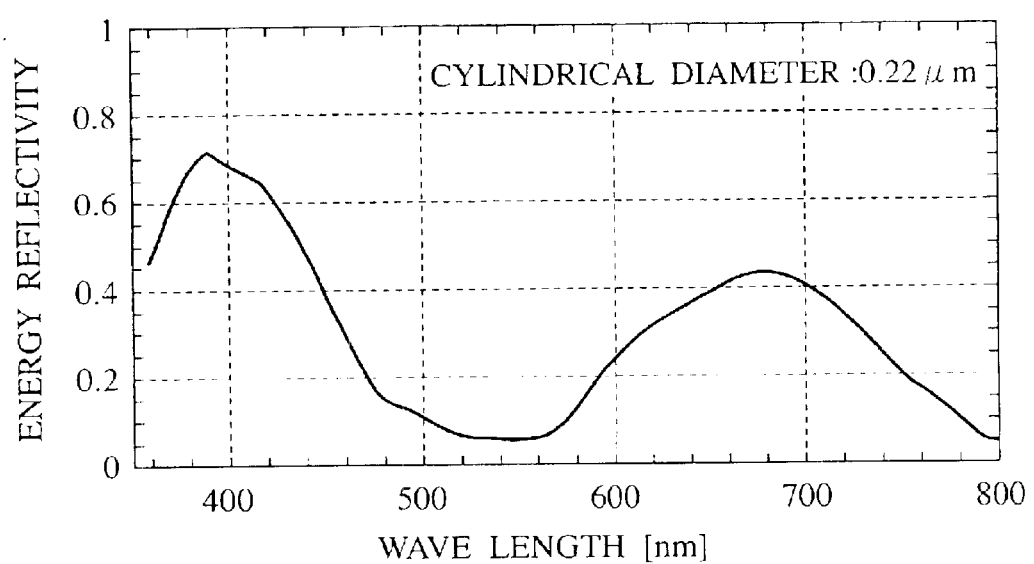
FIG. 37 is a graph showing a reflection spectrum of the structure for reflecting light shown in FIG. 21 when the diameter of a cylindrical fine structure is 0.22 μm.

FIG. 34 shows a reflection spectrum in the structure shown in FIG. 32 (in the case where the cylindrical bodies contact with each other: D=P=0.28 μm). For reference, FIGS. 35 to 37 show reflection spectra in the cases where a diameter D of the cylindrical body is smaller than 0.28 μm, that is, 0.16 μm, 0.19 μm and 0.22 μm, respectively. Blue is intended to be obtained as coloring. As materials, Ny6 and PET described above are used. Herein, a pitch P=0.28 μm, the number of rows of the groups of fine structures $N_{ym}$=5, and an incident angle α=45 degrees.

As is apparent from FIG. 34, reflection peaks are observed in the vicinity of two wave lengths, that is, in the vicinity of a wave length λ=400 nm and in the vicinity of a wave length λ=680 nm. A main peak is positioned in the vicinity of λ=680 nm. In this case, purple is generally presented as a color. Moreover, even when the diameter D of the cylindrical body (fine structure) decreases, the positions of two reflection peaks hardly change and only the magnitude of reflection intensities shows a tendency to change. Therefore, it is understood that sufficiently practical light reflection functions are expressed.

From the examples as described above, the inventors of the present invention have found that the following variations are further possible.

Figure 38A:
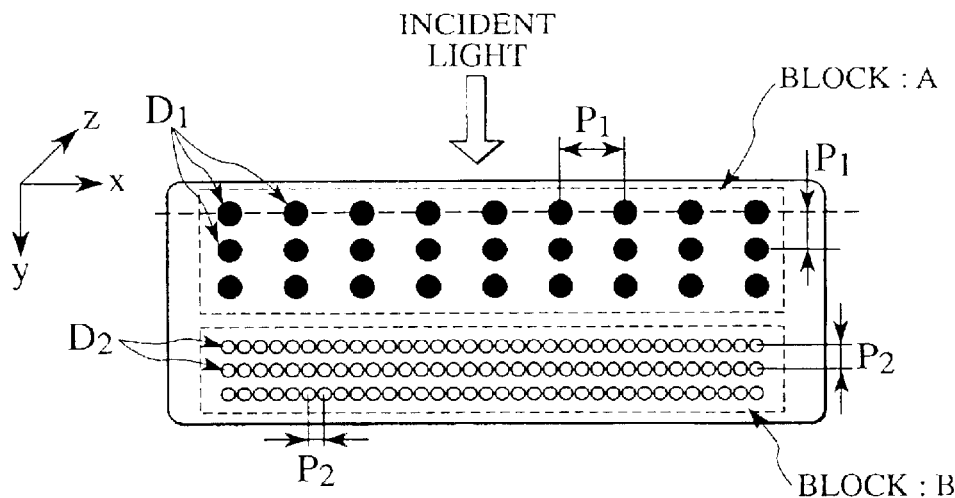
FIGS. 38A to 38I are cross-sectional explanatory views, each showing an example where a structure is composed of two kinds of blocks having different regularities in arrangement, as embodiments of the structure for reflecting light according to the present invention.
Figure 38B:
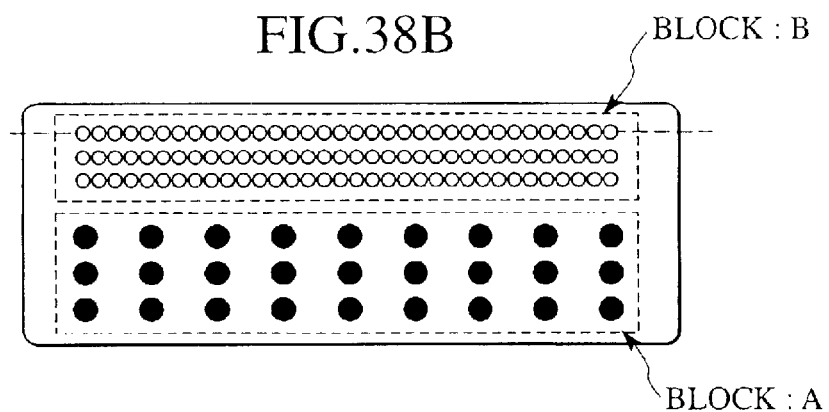
Figure 38C:
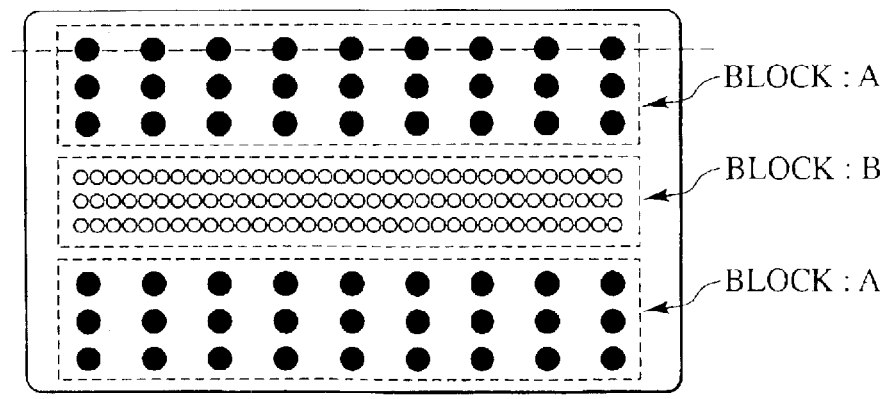

For example, as shown in FIGS. 38A and 38B, the group of fine structures is constituted of a block A and a block B. The block A has regularity (orthogonal arrangement with a diameter $D_1$ and a pitch $P_1$) sufficient to express reflection functions of light substantially based on diffraction and scattering actions, when viewed from the incident light side. The block B may be placed below or above the block A, also with regularity (orthogonal arrangement with a diameter $D_2$ and a pitch $P_2$) sufficient to express reflection functions of light substantially based on diffraction and scattering actions (where $D_2<D_1$, $P_2<P_1$). Further, as shown in FIG. 38C, the group of fine structures can have a sandwich structure in which the block B is interposed between the blocks A.

Here, the functions of the block B is to improve the reflection functions based on diffraction and scattering actions from the block A (a kind of reflection amplification functions). For example, in FIG. 38A, it is particularly desirable that the size and the other specifications are determined in the block B so that the block B generates the same reflection wave length $\lambda_0$ as a reflection wave length $\lambda_0$ (0-order reflection wave length: refer to FIG. 1B) based on diffraction and scattering actions from the block A situated above the block B. As an example, assuming that a reflection wave length $\lambda_0$ based on diffraction and scattering actions from the block A is 0.47 µm (blue coloring), it is preferred that a reflection wave length $\lambda_0$ based on diffraction and scattering actions from the block B is also 0.47 µm (blue coloring).

Specifically, in order to express such functions, it is more desirable that a diameter $D_2$ of each of the fine structures 3 in the block B is as close as possible to $\lambda/(4n_a)$ which is equivalent to a reflection peak wave length $\lambda_0$ from the block A. Further, it is more desirable that a pitch $Py_2$ of the fine structures 3 in the y direction is as close as possible to $(\lambda/(4n_a)+\lambda/(4n_b))$. It is more preferred that a pitch $Px_2$ of the fine structures 3 in the x direction is as close as possible to the diameter $D_2$. Setting the pitch $Px_2$ in the x direction so as to be close to the diameter $D_2$ means that the fine structures are at the closest positions to each other or they are in contact with each other, resulting in a layered structure in appearance. With such a structure, it is possible to remarkably increase a reflectivity at a reflection wave length $\lambda_0$ of interest owing to the multiplier effects of reflections from both of the block A and the block B.

As in FIGS. 38A to 38C, FIGS. 38D to 38G show examples of variations where blocks, each having reflection functions, are combined.

Figure 38D:
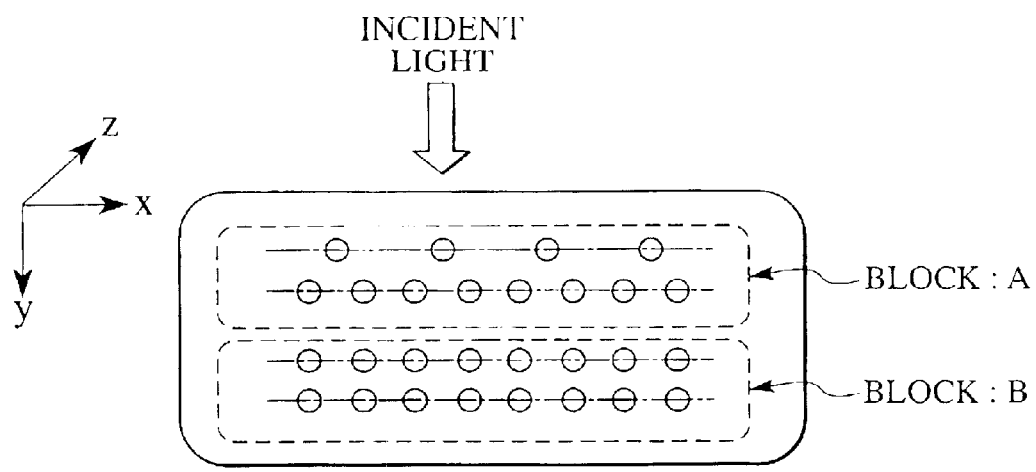
Figure 38E:
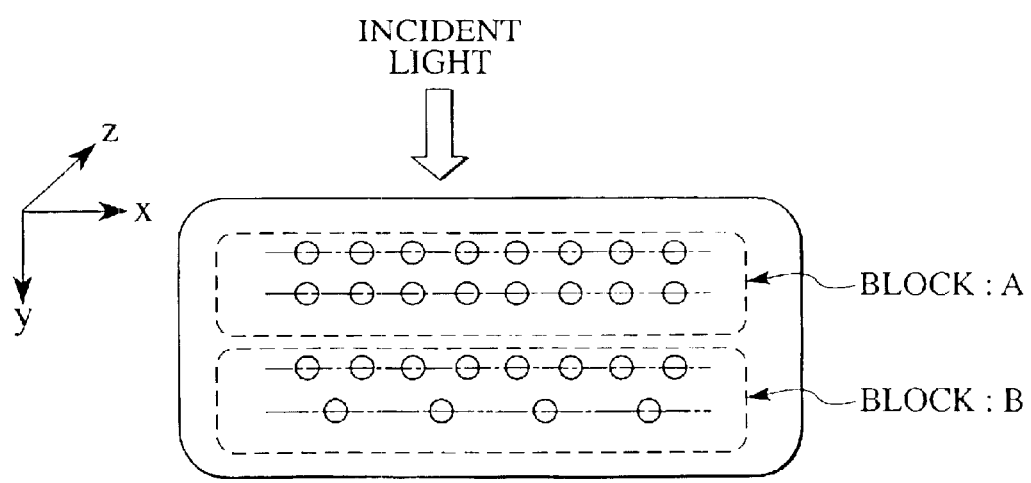
Figure 38F:
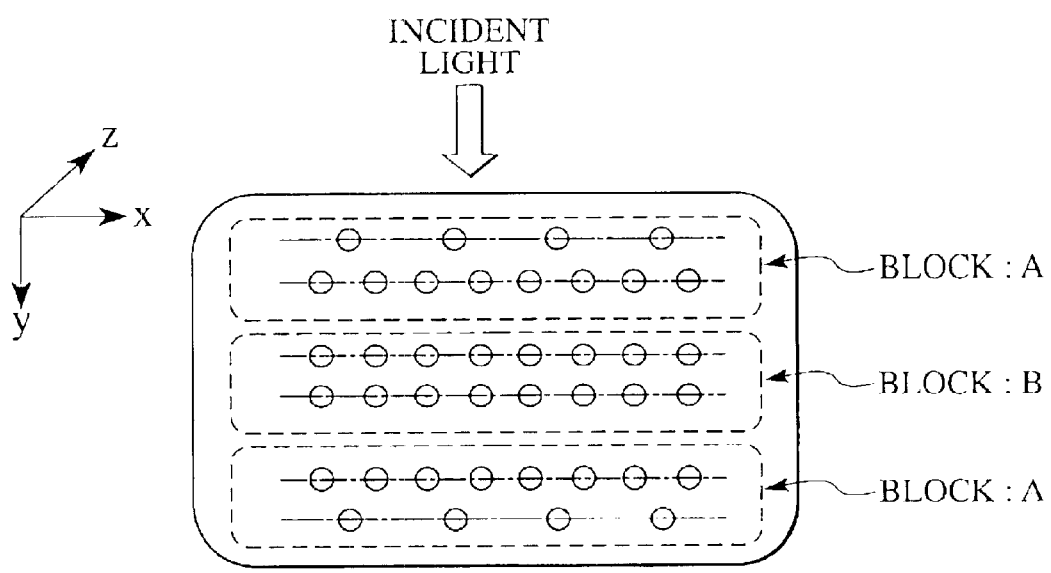
Figure 38G:
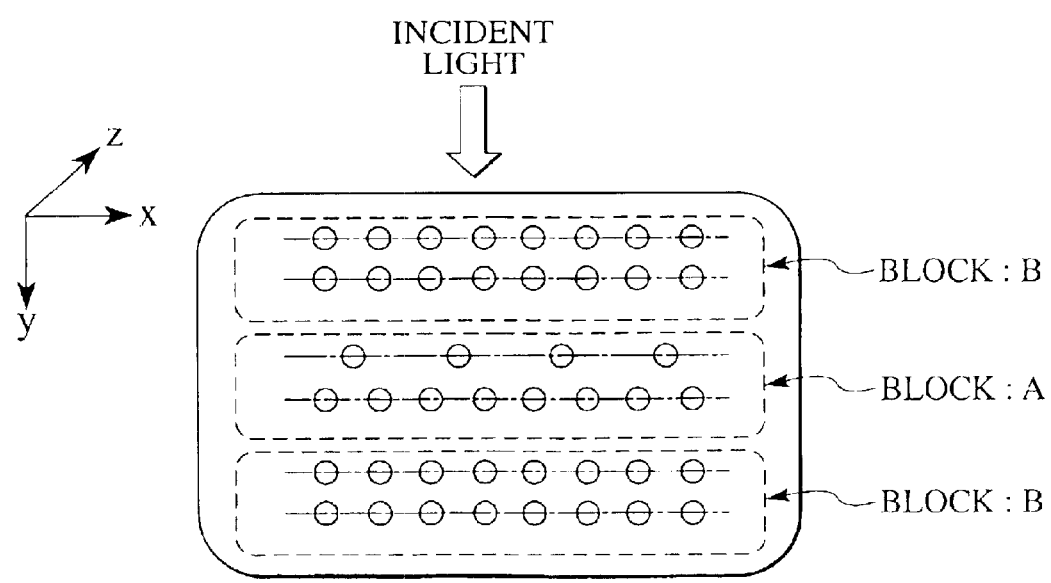

In structures shown in FIGS. 38D and 38E, a block A, in which the group of fine structures is arranged in a triangle form, and a block B, in which the group of fine structures is arranged in an orthogonal (quadrangular) form, are combined in the y direction. Moreover, FIGS. 38F and 38G show examples where the block A and the block B are combined in three rows. In the structure shown in FIG. 38F, the block B having the orthogonal arrangement is interposed between the blocks A, each having the triangular arrangement. In the structure shown in FIG. 38G, contrary to the structure shown in FIG. 38F, the block A having the triangular arrangement is interposed between the blocks B, each having the orthogonal (quadrangular) arrangement.

As described above, the blocks, each having regularity sufficient to express reflection functions of light based on diffraction and scattering actions, are combined, thereby solving the problem that a color is perceived as gray at a wide viewing angle and providing refined brilliance and bright colors which are peculiar to physical coloring.

From the examination of a series of cross-sectional structures, the inventors of the present invention have also found that the following variations allow multifunctional optical properties to be expressed.

Figure 38H:
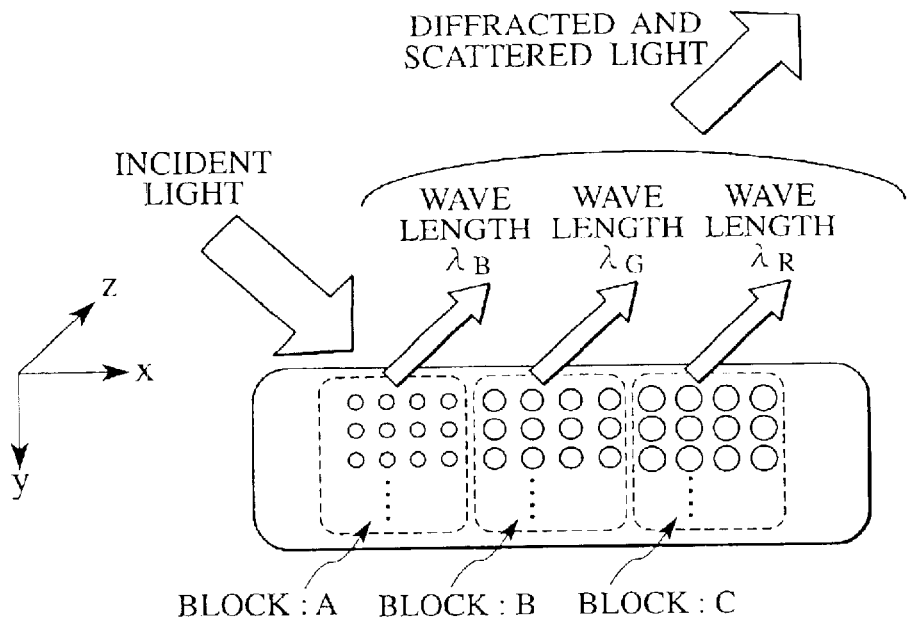
Figure 38I:
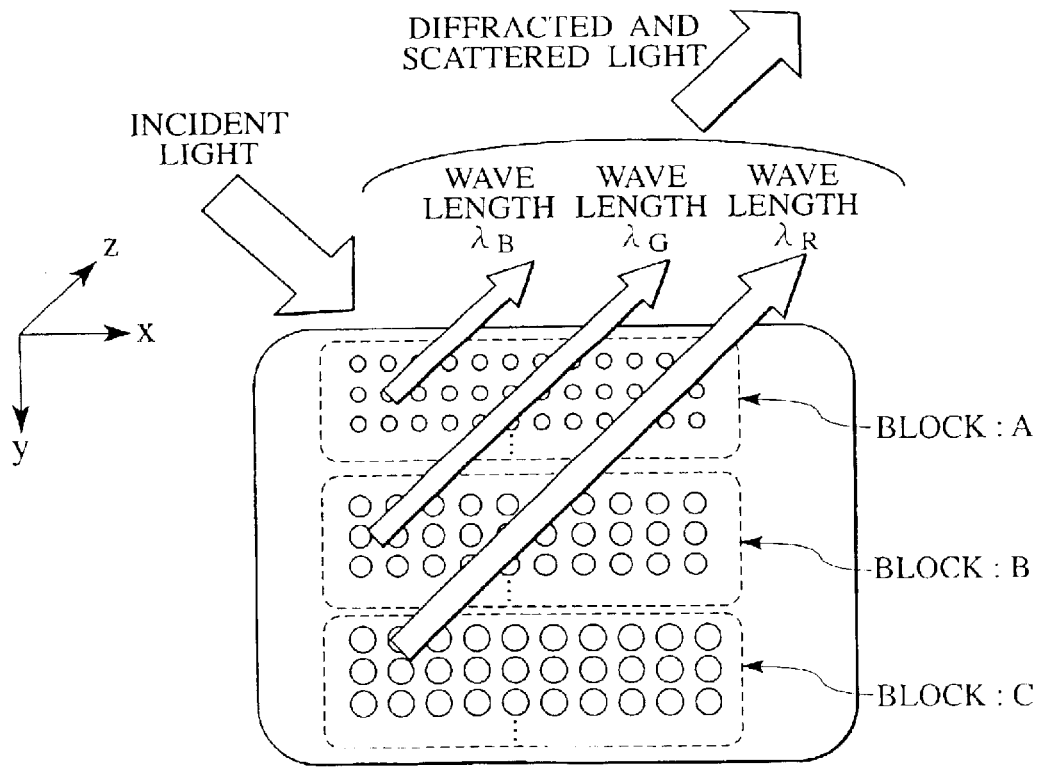

FIGS. 38H and 38I are based on the structure having light reflection functions shown in FIGS. 1A and 1B. FIGS. 38H and 38I show that a plurality of groups of fine structures are arranged in the x or y direction of the structure as blocks emitting light of different wave lengths from one another. In the structure shown in FIG. 38H, three blocks are arranged in the x direction. Blue light $\lambda_B$ is emitted from the left block A, green light $\lambda_G$ is emitted from the central block B, and red light $\lambda_R$ is emitted from the right block C. As described above, the structure is constituted so that three primary colors of light are emitted based on diffraction and scattering actions. With such a structure, a color is not perceived as gray even if a viewing angle (light receiving angle) is greatly changed, for example, at 60 degrees or 70 degrees from the normal direction. Therefore, high quality coloring, maintaining color tones, can be realized.

Next, the structure shown in FIG. 38I is constituted by placing a plurality of the above-described blocks in the y direction, so that various colors of light can be expressed. For example, when the three primary colors of light can be emitted based on diffraction and scattering action, i.e., blue light $\lambda_B$ can be emitted from the block A situated on the incident light side, green light $\lambda_G$ can be emitted from the central block B, and red light $\lambda_R$ can be emitted from the block C situated below the block B, various "colors of light" other than black can be expressed by controlling the intensity of light emitted from each block (changing the number of rows of the fine structures situated within each block in the y direction or changing a diameter of the fine structure) (i.e., additive color mixture). When the light intensities of the three primary colors are controlled to be identical, $\lambda_B+\lambda_G+\lambda_R=\lambda_W(\lambda_W$: white) is obtained, and then light is perceived as white to our eyes.

In addition, since a different color of light is emitted from each of the blocks, and therefore diffracted light and scattered light are reflected from one of the blocks without fail, a color of light is not perceived as gray even if a viewing angle (light receiving angle) is greatly changed. Therefore, this structure has a characteristic of maintaining the color.

The fine structures within each of the above-described blocks may be arranged in any form as long as the fine structures are arranged with regularity sufficient to express reflection functions of light based on diffraction and scattering actions. For example, polygonal arrangements (a triangle arrangement, an orthogonal arrangement (quadrangular arrangement), a pentagonal arrangement, a hexagonal arrangement and the like) in the x-y plane described above can be cited as examples. Further, in the above examples, three blocks are arranged so as to emit light of three primary colors, respectively, i.e., blue B, green G and red R. However, the arrangement of blocks is not necessarily limited thereto (various combinations are possible, for example, a combination of two blocks so that green G light and red R light are emitted, and the like).

As described above, the inventors of the present invention have found that it is not until the group of fine structures maintains the regularity in the x-axis, y-axis and z-axis directions that desired reflection functions based on diffraction and scattering actions owing to interactions with light can be obtained, wherein the structure is made of at least the first and second materials having different refractive indices, at least the first material having light transmittance in a cross section of the structure, the structure including the group of fine structures made of the second material surrounded by the first material.

In the structure 1 for reflecting light of the present invention, a thickness of the first material 2 covering the group of the fine structures 3 made of the second material is also an important factor. The thickness may be such that the material is enough to serve as a mere protection. It is desired that the thickness is adjusted to a proper value in view of various resistances (such as abrasive resistance and scratch resistance) and weather resistance. In addition to such a practical function, it is possible to provide a function for further improving the reflection functions of light substantially based on diffraction and scattering actions by selecting a proper light transmitting material and adjusting a thickness thereof.

Figure 39A:
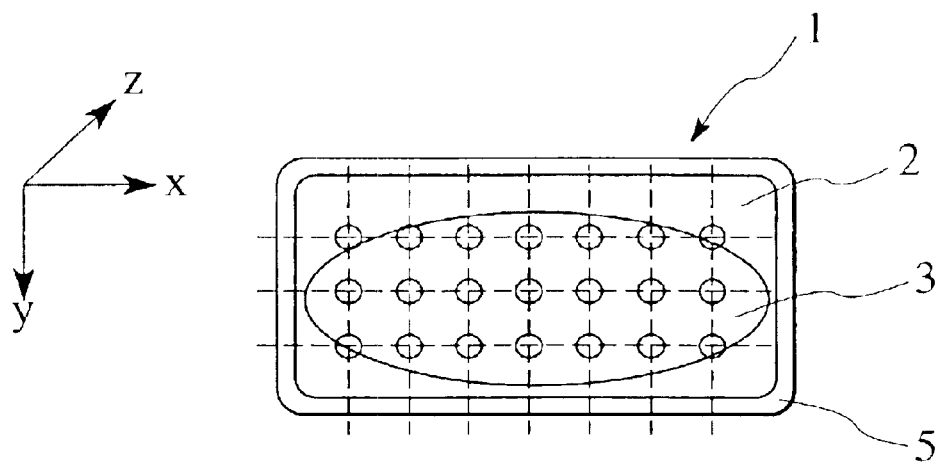
FIGS. 39A and 39B are cross-sectional explanatory views, respectively, showing an example where a primary coating layer is provided around the structure for reflecting light and an example where a primary coating layer and a secondary coating layer are provided around the structure, as embodiments of the structure for reflecting light according to the present invention.
Figure 39B:
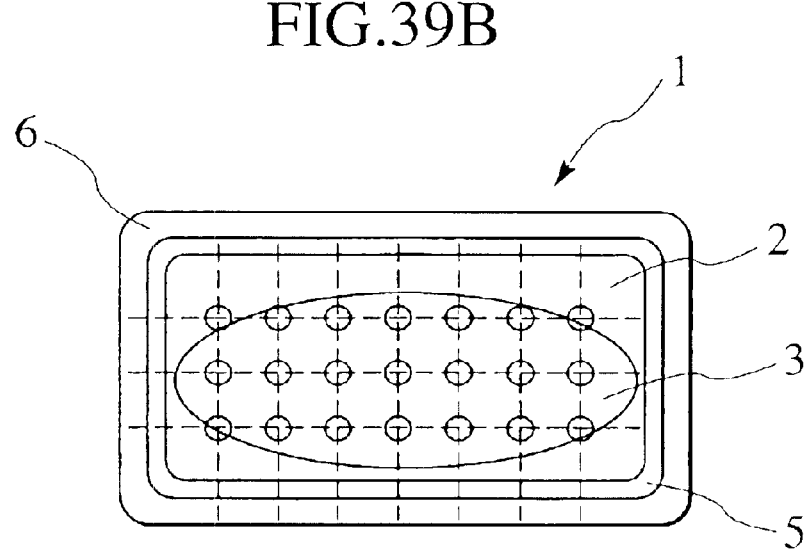

For example, the structure 1 for reflecting light as shown in FIGS. 1A and 1B may be covered with the same or different light transmitting material as a primary coating or a secondary coating. FIGS. 39A and 39B are schematic views thereof. The structure 1 is covered with a protective layer 5 made of a third light transmitting material having a larger refractive index than those of the first material 2 and the second material 3 so as to improve a reflectivity and further enhance the quality. As shown in FIG. 39B, the protective layer (primary coating layer) 5 may be further covered with a secondary coating layer 6.

Regarding a thickness of the first material or a thickness of the protective layer 5 covering the first material, if an optical thickness obtained as a product of a refractive index of the light transmitting material and a thickness thereof (refractive index×thickness) is not properly selected, then reflection occurring in this portion and reflection based on diffraction and scattering actions may offset each other (a phase shift may occur). Therefore, it is required to pay attention to a thickness of the first material or a thickness of the protective layer 5 covering the first material.

In order to improve the glossiness of the structure 1 for reflecting light according to the present invention, a material having a higher smoothness is selected from the first material 2 and the second material 3 to be provided as the protective layer 5. Further, a third light transmitting material having a higher smoothness than those of the first and the second materials may be provided as the protective layer 5. Such a protective layer 5 may be formed by extrusion at a time (integral formation) using a complex melt spinning die or a molding die when a fibrous or film-like structure is to be formed, or may be formed as a primary coating or a secondary coating in the subsequent step.

Next, the formation of the structure 1 for reflecting light of the present invention will be described, taking a polymer material described above as an example. Namely, as representative means for forming the fibrous or film-like structures for reflecting light, a complex melt spinning method or a co-extrusion method can be given.

Regarding the formation of the structure for reflecting light (fiber) through the complex melt spinning method, a sea-island like structure molding die (Japanese Patent Application Publication No. S44-13208 and Japanese Patent Application Publication No. S44-18369) uses a special die, and a first material and a second material which are two meltable polymers. The special die is analogously on a larger scale so as to highly precisely form the group of super-fine structures in a regular orthogonal arrangement with a diameter D of an island-like portion and a pitch P between the centers of island-like portions. A non-stretched thread is formed under proper spinning conditions (a die temperature, a temperature under the die, a total amount of discharge, a ratio of the amount of discharge, a winding speed and the like). In order to express desired optical functions and to improve mechanical properties, a thermal stretching treatment and the like is performed under proper conditions (a temperature, a winding speed, a stretch ratio and the like) as the next step. Therefore, the structure 1 for reflecting light is obtained. In consideration of a stress balance of the two meltable polymers in a flow path of the die and under an outlet of the die, it is desirable that the two polymers have melt viscosity characteristics as similar as possible to each other.

The cross-sectional shape and size of the thread are not particularly limited as described above. Although a thread which has shape and size suitable for the purpose can be used, a thread generally having the micron order size on a single thread level is preferred in view of fabrication whichever of a circular cross section and a rectangular cross section the thread may have.

In the structure for reflecting light according to the present invention, it is possible to obtain minute chips (platelets) by bundling several hundreds to several thousands of the structures 1 so as to form a cross section in a certain size and then mechanically cutting the bundled structures by a cutter or the like. For example, after about several thousands of the structures are assembled using a proper impregnating solution (for example, water) to form a diameter of several tens of mm, the structures can be successively cut into platelets having a length of about several tens of μm to about several mm by an automatic cutter equipped with a delivery mechanism for the assembled bundle. A method of chipping and the like are described on pages 116 and 117 of "textile engineering (II): manufacturing, structure and material characteristics of textile" published by THE TEXTILE MACHINERY SOCIETY OF JAPAN and on pages 233 to 235 of "textile engineering (III): manufacturing, performance and material characteristics of thread" published by THE TEXTILE MACHINERY SOCIETY OF JAPAN.

Alternatively, after the structures 1 are bundled as described above, the structures can undergo a freezing treatment, and then is grinded by various methods to powder in a predetermined size. Any of the above-described structures can be widely applied to various fields as an unprecedented excellent colorant.

Such minute chips (platelets) or powder are used as flakes for a paint having light transmittance, such that the paint containing the flakes can be applied on various inner and outer faces of automobiles, electric appliances, building materials, toys and sporting goods. Owing to such applications, excellent designability can be realized without any large dead angle in every viewing direction, with the brightness of tones and the profoundness of colors obtained by the steepness of a reflection spectrum.

Furthermore, the above chips or powder may be mixed into a film or various plastic molds as flakes or may be mixed into a non-woven fabric or a paper to manufacture a wall paper or a shoji paper.

(First Preferred Embodiment)

As a first material having light transmittance, Nylon 6 (Ny6) having an average refractive index $n_1=1.53$ was selected. As a second material for forming the fine structures 3, polyethylene terephthalate (PET) having an average refractive index $n_2=1.63$ was selected. With these materials, the spinning was performed so as to obtain the structure 1 having light reflection functions with a rectangular shape as shown in FIGS. 2A and 2B under the following conditions.

First, as a die, a die obtained by partially modifying a complex spinning die described in Japanese Patent Application Laid-Open No. H8-226011 was prepared. After mounting the die onto a melting complex spinning apparatus, a non-stretched thread was obtained by appropriately varying the amount of discharge under the conditions: a spinning temperature of 285° C. and a winding speed of 3 km/min to 5 km/min. The non-stretched thread further underwent a heat stretching treatment to have a smaller diameter, thereby obtaining the structure 1 having light reflection functions.

When a cross section of the obtained thread was observed through an electron microscope, the shape of the cross section of the thread was rectangular and the size of the cross section was about 5.8 μm×22 μm. It was confirmed that, within the thread, a group of fine structures composed of cylindrical bodies having an average diameter D=0.19 μm was regularly arranged with an average pitch P=0.28 μm (orthogonal arrangement of 10 rows×60 columns). The single thread was measured for its reflection spectrum at an incident angle θ=45 degrees in a visible light range, using a spectrophotometer equipped with an integrating sphere, which was obtained by improving the Spectrophotometer model U-4000 manufactured by Hitachi, Ltd. A standard white plate served as a reference to measure a reflectivity. The obtained reflection spectrum had a main peak in a wave length λ=0.40 μm and a subpeak in the vicinity of a wave length λ=670 nm. A reflectivity R at the main peak was 65%, and a half width B of the spectrum at the wave length was small, i.e., about 70 nm. Thus, the spectrum presented a steep shape.

Further, it was confirmed that violet color was observed also when viewed at an angle of about 45 degrees. Even when a viewing angle was greatly changed within the range of 0 to 60 degrees, violet to purple color was clearly observed without being perceived as gray as is in the interference type fabric.

(Second Preferred Embodiment)

Using the same polymers as in the first embodiment, a cross sectional structure to be obtained was set in an orthogonal arrangement as shown in FIG. 32 in which fine structures were in close contact with each other. A spinning treatment and a heat stretching treatment were conducted in the same procedure as in the first embodiment using a die obtained by partially modifying a complex spinning die described in Japanese Patent Application Laid-Open No. H8-226011, thereby obtaining the structure 1 having light reflection functions.

When a cross section of the obtained thread was observed through an electron microscope, the shape of the cross section of the thread was rectangular and the size of the cross section was about 6.8 μm×25 μm. Within the thread, a group of fine structures composed of cylindrical bodies having an average diameter D=0.28 μm was regularly arranged with an average pitch P=0.28 μm (orthogonal arrangement of 10 rows×60 columns). The single thread was measured for its reflection spectrum at an incident angle θ=45 degrees in a visible light range, using the above-mentioned improved spectrophotometer. A standard white plate served as a reference to measure a reflectivity. The obtained reflection spectrum had a main peak in a wave length λ=0.68 μm and a subpeak in the vicinity of a wave length λ=0.42 μm. A reflectivity R at the main peak was about 56%, and a half width B of the spectrum was about 140 nm.

Further, it was confirmed that purple color was observed also when viewed at an angle of about 45 degrees. Even when a viewing angle was greatly changed within the range of 0 to 60 degrees, violet to purple color is clearly observed without being perceived as gray as is in the interference type fabric.

(Third Preferred Embodiment)

Using the same polymers as in the first and second embodiments, a cross sectional structure to be obtained was set in an orthogonal arrangement as shown in FIGS. 2A and 2B. A spinning treatment and a heat stretching treatment were conducted in the same procedure as in the first and second embodiments using a die obtained by partially modifying a complex spinning die described in Japanese Patent Application Laid-Open No. H8-226011, thereby obtaining the structure 1 having light reflection functions.

When a cross section of the obtained thread was observed through an electron microscope, the shape of the cross section of the thread was rectangular and the size of the cross section was about 6.2 μm×26 μm. Within the thread, a group of fine structures composed of cylindrical bodies having an average diameter D=0.16 μm was regularly arranged with an average pitch P=0.28 μm, (orthogonal arrangement of 10 rows×60 columns). The single thread was measured for its reflection spectrum at an incident angle θ=45 degrees in a visible light range, using the above-mentioned improved spectrophotometer, with a standard white plate serving as a reference. The obtained reflection spectrum had a main peak in a wave length λ=0.4 μm and a subpeak in a wave length λ=0.66 μm. A reflectivity R at the main peak was about 52%, and a half width B of the spectrum was about 125 nm.

Further, it was confirmed that purple color was observed also when viewed at an angle of about 45 degrees. Even when a viewing angle was greatly changed within the range of 0 to 60 degrees, violet to purple color was clearly observed without being perceived as gray as is in the interference type fabric.

(Fourth Preferred Embodiment)

Using the same polymers as in the first, second and third embodiments, a cross sectional structure to be obtained was a hexagonal arrangement as shown in FIGS. 17A and 17B. A spinning treatment and a heat stretching treatment were conducted in the same procedure as in the above-described embodiments except that a spinning temperature is set to 290° C., using a die obtained by partially modifying a complex spinning die described in Japanese Patent Application Laid-Open No. H8-226011, thereby obtaining the structure 1 having light reflection functions.

When a cross section of the obtained thread was observed through an electron microscope, the shape of the cross section of the thread was rectangular and the size of the cross section was about 5.2 μm×19 μm. Within the thread, a group of fine structures composed of cylindrical bodies having an average diameter D=0.09 μm was regularly arranged with an average pitch P=0.16 μm (hexagonal arrangement of 10 rows×60 columns) in close contact with each other. The single thread was measured for its reflection spectrum at an incident angle θ=45 degrees in a visible light range, with the above-mentioned improved spectrophotometer, using a standard white plate as a reference. The obtained reflection spectrum had a main peak in a wave length λ=0.62 μm and a subpeak in a wave length λ=0.40 μm. A reflectivity R at the main peak was about 40%, and a half width B of the spectrum was about 120 nm.

Further, it was confirmed that purple color was observed also when viewed. Even when a viewing angle was greatly changed within the range of 0 to 60 degrees, violet to purple color was clearly observed without being perceived as gray as is in the interference type fabric.

(Fifth Preferred Embodiment)

As a first material having light transmittance, Nylon 6 (Ny6) having an average refractive index $n_1$=1.53 was selected. As a second material for forming the fine structures 3, polyethylene terephthalate (PET) having an average refractive index $n_2$=1.63 was selected. With these materials, the spinning was performed so as to obtain the structure 1 having light reflection functions (having a rectangular cross section and including the group of fine structure in a triangle arrangement) as shown in FIGS. 19A to 19C under the following conditions.

As a die, a complex spinning die (a final outlet having a rectangular shape) for fabrication of sea-island like complex fabrics was prepared. After mounting the die onto a melting complex spinning apparatus, a non-stretched thread was obtained by appropriately varying the amount of discharge under the conditions: a spinning temperature of 285° C. and a winding speed of 3 km/min to 5 km/min. The non-stretched thread further underwent a heat stretching treatment to have a smaller diameter, thereby obtaining the structure (filament) 1 having light reflection functions of interest.

When a cross section of the obtained filament was observed through an electron microscope, the shape of the cross section of the filament was rectangular. Within the filament, a group of fine structures (cylindrical bodies) was arranged in a triangular form. The following values were obtained: a diameter 2R of the closest cylindrical body to the light incident side, contributing a coloring wave length,= 0.10 µm; a pitch P between such cylindrical bodies=0.44 µm; a diameter 2r of the cylindrical bodies at the other two points constituting the base of the triangle=0.08 µm; a pitch $P_1$ between the two points=0.22 µm; a pitch $P_2$ between adjacent triangles, considering a triangle as a unit (the smallest unit of regularity)=0.21 µm; and the number N of rows of units in the y direction (considering a triangle as a unit)=11.

The structure (filament) 1 was measured for its reflection spectrum at an incident angle θ=45 degrees, using the above-mentioned improved spectrophotometer. As shown in FIG. 21, the obtained reflection spectrum had a reflection peak wave length of 440 nm and a peak reflectivity of 89%, exhibiting violet color. Even when a viewing angle was greatly changed within the range of 0 to 60 degrees, violet to orange color was observed without being perceived as gray.

(Sixth Preferred Embodiment)

As a first material having light transmittance, polymethyl metacrylate (PMMA) having an average refractive index $n_1$=1.49 was selected. As a second material for forming the fine structures 3, polyethylene terephthalate (PET) having a refractive index $n_2$=1.63 was selected. With these materials, the spinning was performed so as to obtain the structure 1 having light reflection functions (having a rectangular cross section and including the group of fine structures in a pentagonal arrangement) as shown in FIGS. 24A to 24C under the following conditions.

As a die, a complex spinning die (a final outlet having a rectangular shape) for fabrication of sea-island like complex fabrics was prepared. A non-stretched thread was obtained in the same manner as in the fifth embodiment. The non-stretched thread further underwent a heat stretching treatment to acquire a smaller diameter, thereby obtaining the structure (filament) 1 having light reflection functions of interest.

When a cross section of the obtained filament was observed through an electron microscope, the shape of the cross section of the filament was rectangular. Within the filament, a group of fine structures (cylindrical bodies) formed a pentagonal arrangement. The following values were obtained: a diameter 2R of the closest cylindrical body to the light incident side, contributing to a coloring wave length,=0.10 µm; a pitch P between such cylindrical bodies= 0.42 µm; a diameter 2r of the cylindrical bodies at two points (i.e., other than the vertex and the points constituting the base) of the pentagon=0.08 µm; a pitch $P_{y1}$ in the y direction=0.12 µm; a pitch $P_{y2}$ between adjacent pentagons, considering a pentagon as a unit (the smallest unit of regularity)=0.24 µm; and the number N of rows of units in the y direction (considering a pentagon as a unit)=11.

Figure 40:
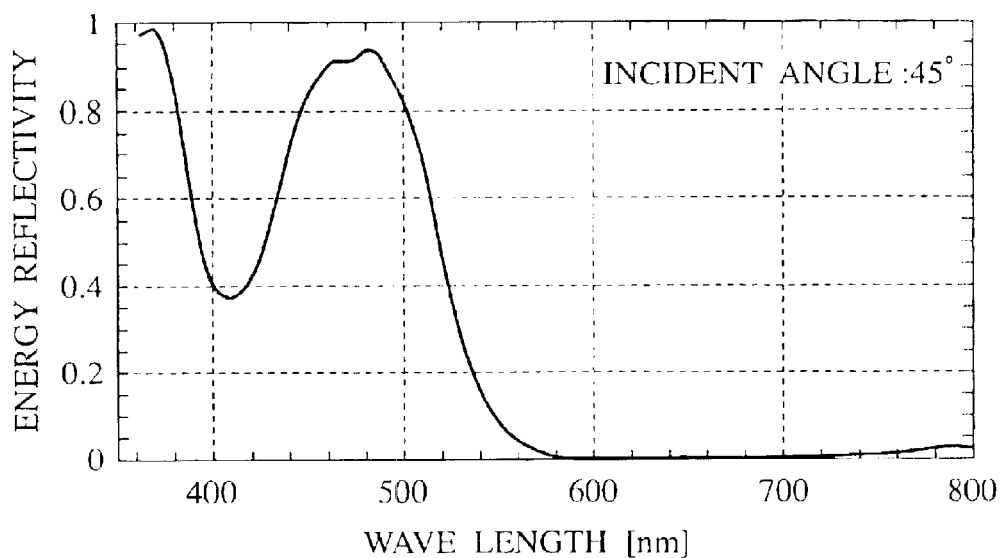
FIG. 40 is a graph showing a reflection spectrum at an incident angle of 45 degrees in a sixth embodiment.

The structure (filament) 1 was measured for its reflection spectrum at an incident angle θ=45 degrees, using, the above-mentioned improved spectrophotometer. As shown in FIG. 40, the obtained reflection spectrum had a reflection peak wave length of 665 nm and a peak reflectivity of 72%, exhibiting red color. Even when a viewing angle was greatly changed within the range of 0 to 60 degrees, purple to red color was observed without being perceived as gray.

(Seventh Preferred Embodiment)

As a first material having light transmittance, Nylon 6 (Ny6) having an average refractive index $n_1$=1.53 was selected. As a second material for forming the fine structures 3, polyethylene terephthalate (PET) having a refractive index $n_2$=1.63 was selected. With these materials, the spinning was performed so as to obtain the structure 1 having light reflection functions (having a rectangular cross section and including the group of fine structures in an octagonal arrangement) as shown in FIGS. 28A and 28B under the following conditions.

A spinning treatment and a heat stretching treatment were conducted in the same procedure as in the sixth embodiment to obtain the structure 1 having light reflection functions.

When a cross section of the obtained filament was observed through an electron microscope, the shape of the cross section of the filament was rectangular. Within the filament, a group of fine structures (cylindrical bodies) formed an octagonal arrangement. The following values were obtained: a diameter 2R of the closest cylindrical body to the light incident side, contributing to a coloring wave length,=0.10 µm; a pitch P between such cylindrical bodies= 0.44 µm; a diameter 2r of the cylindrical bodies at the four points other than two vertices and the two points of the base=0.07 µm; a pitch $P_{y1}$ between the two points in the y direction=0.29 µm, a pitch $P_{y2}$=0.44 µm; and the number N of rows of units in the y direction (considering an octagon as a unit)=11.

Figure 41:
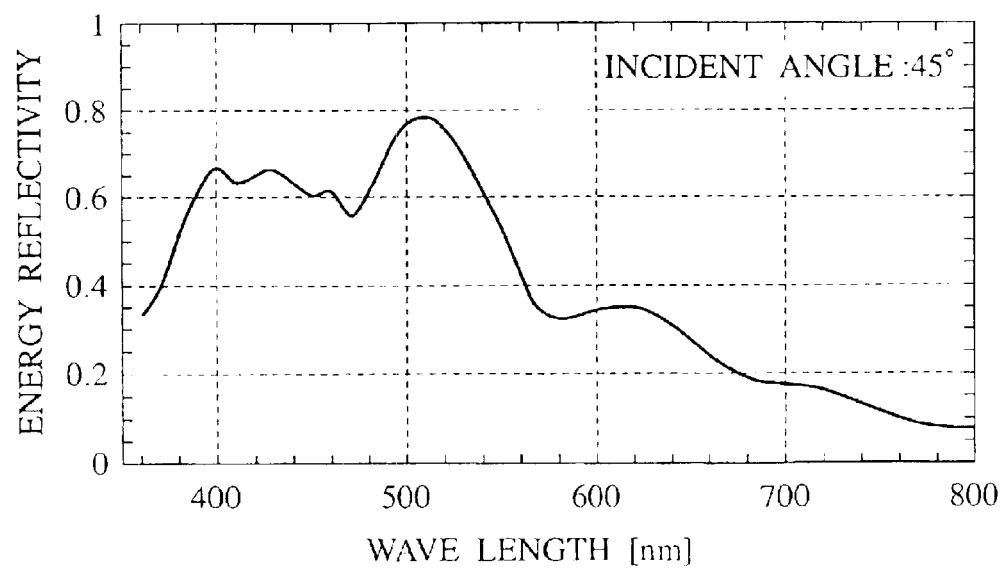
FIG. 41 is a graph showing a reflection spectrum at an incident angle of 45 degrees in a seventh embodiment.

The structure (filament) 1 was measured for its reflection spectrum at an incident angle θ=45 degrees, using the above-mentioned improved spectrophotometer. As shown in FIG. 41, the obtained reflection spectrum had a reflection peak wave length of 510 nm and a peak reflectivity of 78%, exhibiting blue green color. Even when a viewing angle was greatly changed within the range of 0 to 60 degrees, blue to green color was observed without being perceived as gray.

(Eighth Preferred Embodiment)

As a first material having light transmittance, Nylon 6 (Ny6) having an average refractive index $n_1$=1.53 was selected. As a second material for forming the fine structures 3, polyethylene terephthalate (PET) having an average refractive index $n_2$=1.63 was selected. With these materials, the spinning was performed so as to obtain the structure 1 having light reflection functions (the fiber having a rectangular cross section and including the group of orthogonally arranged fine structures in three blocks, the blocks being placed so as to emit blue light, green light and red light, respectively) as shown in FIG. 38I under the following conditions.

A spinning treatment and a heat stretching treatment were conducted in the same procedure as in the seventh embodiment to obtain the structure 1 having light reflection functions.

When a cross section of the obtained filament was observed through an electron microscope, the shape of the cross section of the filament was rectangular. Within the filament, three blocks, each including the fine structures with a different diameter, were arranged in the y direction. The numbers N of rows of units of the fine structures (cylindrical bodies) in the respective three blocks were 6, 8 and 6, from the block which was the closest to the light incident side (from the block including the cylindrical bodies with the smallest diameter).

Figure 42:
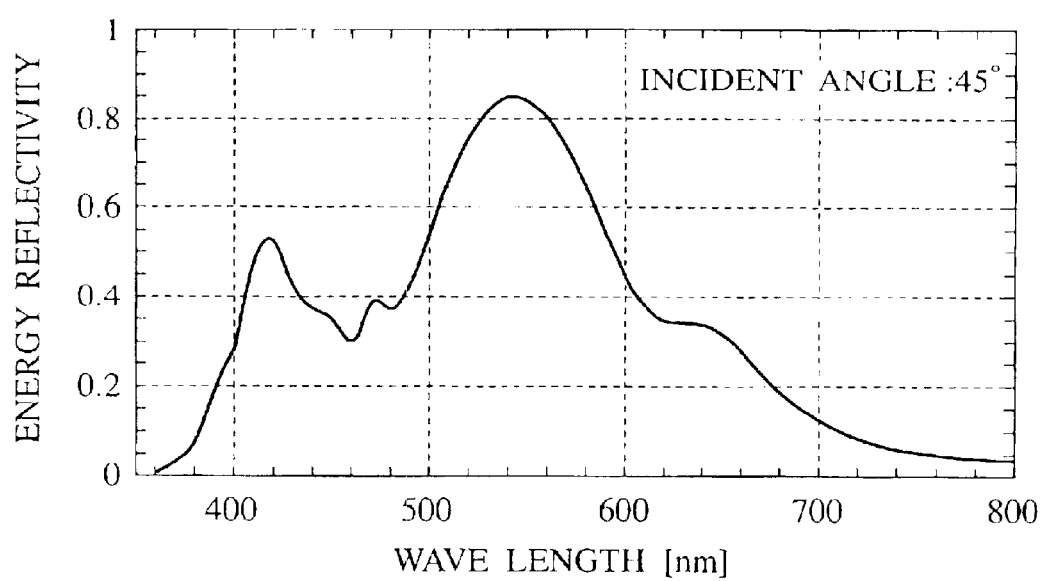
FIG. 42 is a graph showing a reflection spectrum at an incident angle of 45 degrees in an eighth embodiment.

A reflection spectrum was measured at an incident angle θ=45 degrees, using the above-mentioned improved spectrophotometer. As shown in FIG. 42, the obtained reflection spectrum had a reflection peak wave length of 542 nm and a peak reflectivity of 86%, exhibiting green color. Even when a viewing angle was greatly changed within the range of 0 to 60 degrees, violet to green color was observed without being perceived as gray.

The present disclosure relates to subject matters contained in Japanese Patent Application No. 2001-237342, filed on Aug. 6, 2001 and Japanese Patent Application No. 2002-215402, filed on Jul. 24, 2002, the disclosure of which is expressly incorporated herein by reference in its entirety.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. A structure for reflecting light, in any one of a fibrous form and a film form, having an optical function of at least one of reflection properties for a visible ray, an infrared ray and an ultraviolet ray, the structure comprising:
   a first material; and
   a second material having a different refractive index from that of the first material, wherein at least the first material has light transmittance in a cross section of the structure,
   wherein a group of a plurality of fine structures formed of the second material is surrounded by the first material, and arranged within the first material with regularity sufficient to express reflection functions of light based on diffraction and scattering actions, and
   wherein each of the fine structures has a predetermined cross sectional shape, and wherein, assuming that an incident direction of light is a y direction, a direction opposing the y direction, in which the group of the plurality of fine structures is formed, is an x direction, and a depth direction of the group of the plurality of fine structures is a z direction, the group of the plurality of fine structures forms a polygonal regular arrangement in an x-y plane within the first material.

2. The structure according to claim 1, wherein the group of the plurality of fine structures forms a regular arrangement in a matrix of rows and columns in the x-y plane within the first material.

3. The structure according to claim 1, wherein the plurality of fine structures having the predetermined cross sectional shape, form a hexagonal arrangement in the x-y plane within the first material.

4. The structure according to claim 1, wherein the plurality of fine structures, each having the predetermined cross sectional shape, form a triangle regular arrangement in the x-y plane within the first material.

5. The structure according to claim 1, wherein the plurality of line structures, each having the predetermined cross sectional shape, form a pentagonal regular arrangement in the x-y plane within the first material.

6. The structure according to claim 1, wherein the plurality of fine structures, each having the predetermined cross sectional shape, form an octagonal regular arrangement in the x-y plane within the first material.

7. A structure for reflecting light, in any one of a fibrous form and a film form having an optical function of at least one of reflection properties for a visible ray, an infrared ray and an ultraviolet ray, the structure comprising:
   a first material; and
   a second material having a different refractive index from that of the first material, wherein at least the first material has light transmittance in a cross section of the structure,
   wherein a group of a plurality of fine structures formed of the second material is surrounded by the first material, and arranged within the first material with regularity sufficient to express reflection functions of light based on diffraction and scattering actions, and
   wherein the fine structures are uniformly continuous in a longitudinal direction thereof.

8. A structure for reflecting light, in any one of a fibrous form and a film form, having an optical function of at least one of reflection properties for a visible ray, an infrared ray and an ultraviolet ray, the structure comprising:
   a first material; and
   a second material having a different refractive index from that of the first material, wherein at least the first material has light transmittance in a cross section of the structure,
   wherein a group of a plurality of fine structures formed of the second material is surrounded by the first material, and arranged within the first material with regularity sufficient to express reflection functions of light based on diffraction and scattering actions, and
   wherein the cross section of the fine structure is circular.

9. The structure according to claim 8, wherein assuming that a radius of the circular cross section of the fine structure is r (=D/2; D is a diameter of the circular cross section), a pitch between centers of adjacent ones of the fine structures is P in a matrix arrangement of columns and rows in an x-y plane, and a reflection peak wave length based on the diffraction and scattering actions is $\lambda$, a size parameter $\alpha$ (=$\lambda/2\pi r$) and the pitch P satisfy relationships:

$$10^{-2} \leq \alpha \leq 10^3 \text{ and}$$

$$2r\ (=D) \leq P.$$

10. A structure for reflecting light, in any one of a fibrous form and a film form, having an optical function of at least one of reflection properties for a visible ray, an infrared ray and an ultraviolet ray, the structure comprising:
    a first material; and
    a second material having a different refractive index from that of the first material, wherein at least the first material has light transmittance in a cross section of the structure,
    wherein a group of a plurality of fine structures formed of the second material is surrounded by the first material, and arranged within the first material with regularity sufficient to express reflection functions of light based on diffraction and scattering actions, and
    wherein each of the fine structures has a predetermined cross sectional shape, and wherein, assuming that an incident direction of light is a y direction, a direction of the group of the plurality of fine structures, opposing the y direction, is an x direction, and a depth direction of the group of the plurality of fine structures is a z direction, the group of the plurality of fine structures having such regularity that rays of different wave lengths are emitted are present as a plurality of blocks in the x direction.

11. A structure for reflecting light, in any one of a fibrous form and a film form, having an optical function of at least one of reflection properties for a visible ray, an infrared ray and an ultraviolet ray, the structure comprising:

a first material; and a second material having a different refractive index from that of the first material, wherein at least the first material has light transmittance in a cross section of the structure, wherein a group of a plurality of fine structures formed of the second material is surrounded by the first material, and arranged within the first material with regularity sufficient to express reflection functions of light based on diffraction and scattering actions, and wherein each of the fine structures has a predetermined cross sectional shape, and wherein, assuming that an incident direction of light is a y direction, a direction of the group of the plurality of fine structures, opposing the y direction, is an x direction, and a depth direction of the group of the plurality of fine structures is a z direction, the group of the plurality of fine structures having such regularity that rays of different wave lengths are emitted are present as a plurality of blocks in the y direction.

12. A structure for reflecting light, in any one of a fibrous form and a film form, having an optical function of at least one of reflection properties for a visible ray, an infrared ray and an ultraviolet ray, the structure comprising:

a first material; and a second material having a different refractive index from that of the first material, wherein at least the first material has light transmittance in a cross section of the structure.

wherein a group of a plurality of fine structures formed of the second material is surrounded by the first material, and arranged within the first material with regularity sufficient to express reflection functions of light based on diffraction and scattering actions, and wherein the first material has any one cross sectional shape selected from the group consisting of: a circle, an ellipsoid, a rectangle, a star shape, and a polygon.

13. A structure for reflecting light, in any one of a fibrous form and a film form, having an optical function of at least one of reflection properties for a visible ray, an infrared ray and an ultraviolet ray, the structure comprising:

a first material; and a second material having a different refractive index from that of the first material, wherein at least the first material has light transmittance in a cross section of the structure, wherein a group of a plurality of fine structures formed of the second material is surrounded by the first material, and arranged within the first material with regularity sufficient to express reflection functions of light based on diffraction and scattering actions, and wherein a cross sectional shape of each of the fine structures is at least one shape selected from the group consisting of; a circle, an ellipsoid, a rectangle, and a polygon.

14. A structure for reflecting light, in any one of a fibrous form and a film form, having an optical function of at least one of reflection properties for a visible ray, an infrared ray and an ultraviolet ray, the structure comprising:

a first material;

a second material having a different refractive index from that of the first material, wherein at least the first material has light transmittance in a cross section of the structure; and a third material, the third material being combined with the second material, and the refractive index of the third material being higher than that of the second material, and wherein a group of a plurality of fine structures formed of the second material is surrounded by the first material, and arranged within the first material with regularity sufficient to express reflection functions of light based on diffraction and scattering actions.

15. A structure for reflecting light, in any one of a fibrous form and a film form, having an optical function of at least one of reflection properties for a visible ray, an infrared ray and an ultraviolet ray, the structure comprising:

a first material;

a second material having a different refractive index from that of the first material, wherein at least the first material has light transmittance in a cross section of the structure; and a fourth material, wherein a group of a plurality of fine structures formed of the second material is surrounded by the first material, and arranged within the first material with regularity sufficient to express reflection functions of light based on diffraction and scattering actions, and wherein the fourth material is provided around the structures as a protective layer formed of a light transmitting material having a refractive index higher than those of the first material and the second material.

16. A structure for reflecting light, in any one of a fibrous form and a film form, having an optical function of at least one of reflection properties for a visible ray, an infrared ray and an ultraviolet ray, the structure comprising:

a first material; and a second material having a different refractive index from that of the first material, wherein at least the first material has light transmittance in a cross section of the structure, wherein a group of a plurality of fine structures formed of the second material is surrounded by the first material, and arranged within the first material with regularity sufficient to express reflection functions of light based on diffraction and scattering actions, and wherein the first material is constituted of at least one material selected from the group consisting of polymers, glasses, and ceramics.

17. The structure according to claim 15, wherein the polymeric material is any one selected from the group consisting of: simple polymers of polyesters, polyamides, polyolefins, vinyls, polyetherketones, polysulfides, fluorines, and polycarbonates, a blend thereof, and a copolymer of at least two of the polymers.

18. A structure for reflecting light, in any one of a fibrous form and a film form, having an optical function of at least one of reflection properties for a visible ray, an infrared ray and an ultraviolet ray, the structure comprising:

a first material; and a second material having a different refractive index from that of the first material, wherein at least the first material has light transmittance in a cross section of the structure, wherein a group of a plurality of fine structures formed of the second material is surrounded by the first material, and arranged within the first material with regularity sufficient to express reflection functions of light based on diffraction and scattering actions, and wherein the first material contains a pigment and a dye in such an amount that permits light transmittance to be maintained.

19. A structure for reflecting light, in any one of a fibrous form and a film form, having an optical function of at least one of reflection properties for a visible ray, an infrared ray and an ultraviolet ray, the structure comprising:
- a first material; and
- a second material having a different refractive index from that of the first material, wherein at least the first material has light transmittance in a cross section of the structure,
- wherein a growl of a plurality of fine structures formed of the second material is surrounded by the first material, and arranged within the first material with regularity sufficient to express reflection functions of light based on diffraction and scattering actions, and
- wherein the first material and the second material are fine chips with a predetermined length obtained by cutting.

20. A structure for reflecting light, in any one of a fibrous form and a film form, having an optical function of at least one of reflection properties for a visible ray, an infrared ray and an ultraviolet ray, the structure comprising:
- a first material; and
- a second material having a different refractive index from that of the first material, wherein at least the first material has light transmittance in a cross section of the structure, and
- wherein a group of a plurality of fine structures formed of the second material is surrounded by the first material, and arranged within the first material with regularity sufficient to express reflection functions of light based on diffraction and scattering actions, and
- wherein the first material and the second material are in form of powder in predetermined size obtained by grinding.

21. A product is selected from the group consisting of a paint, a film structure, a plastic mold, a non-woven fabric and a wall paper,
wherein the paint, the film structure, the plastic mold, the non-woven fabric and the wall paper comprise a structure for reflecting light; the structure being composed of fine chips having a predetermined length obtained by cutting.

22. A product is selected from the group consisting of a paint, a film structure, a plastic mold, a non-woven fabric and a wall paper,
wherein the paint, the film structure, the plastic mold, the non-woven fabric and the wall paper comprise a structure for reflecting light, the structure being composed of powders in predetermined size obtained by grinding.

23. A light reflecting structure, comprising:
- a first manifold of a light transmitting first material;
- a set of form- or size-defined miniature second manifolds of a second material different from the first material in refractive index; and
- a system of subsets of the set of second manifolds arranged in the first manifold with an at least two dimensional regularity to scatter rays of light to be reflected outside the first manifold.

* * * * *